United States Patent
Guim Bernet et al.

(10) Patent No.: US 11,163,682 B2
(45) Date of Patent: Nov. 2, 2021

(54) SYSTEMS, METHODS, AND APPARATUSES FOR DISTRIBUTED CONSISTENCY MEMORY

(71) Applicant: Intel Corporation, Santa Clara, CA (US)

(72) Inventors: Francesc Guim Bernet, Barcelona (ES); Narayan Ranganathan, Portland, OR (US); Karthik Kumar, Chandler, AZ (US); Raj K. Ramanujan, Federal Way, WA (US); Robert G. Blankenship, Tacoma, WA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 14/983,052

(22) Filed: Dec. 29, 2015

(65) Prior Publication Data

US 2017/0185517 A1  Jun. 29, 2017

(51) Int. Cl.
*G06F 12/0831* (2016.01)
*G06F 12/0813* (2016.01)

(52) U.S. Cl.
CPC ...... *G06F 12/0833* (2013.01); *G06F 12/0813* (2013.01); *G06F 2212/314* (2013.01); *G06F 2212/621* (2013.01)

(58) Field of Classification Search
CPC ............ G06F 11/3003; G06F 12/0806; G06F 12/0833; G06F 12/0813; G06F 2212/314; G06F 2212/621; G06F 2009/45583; G06F 2201/865; G06F 12/084; G06F 12/0808; G06F 12/0811; G06F 12/0824; G06F 9/467
See application file for complete search history.

(56) References Cited

U.S. PATENT DOCUMENTS

| | | | |
|---|---|---|---|
| 6,961,806 B1 | 11/2005 | Agesen et al. | |
| 7,310,709 B1 | 12/2007 | Aingaran et al. | |
| 7,516,277 B2 | 4/2009 | Kilian et al. | |
| 7,613,882 B1 | 11/2009 | Akkawi et al. | |
| 8,347,064 B1* | 1/2013 | Glasco | G06F 12/1027 711/206 |
| 8,838,430 B1 | 9/2014 | Lang et al. | |
| 9,208,091 B2 | 12/2015 | Blaner et al. | |
| 2008/0034355 A1 | 2/2008 | Shen et al. | |

(Continued)

FOREIGN PATENT DOCUMENTS

WO  2010/076020 A1  7/2010
WO  2013/088173 A1  6/2013

OTHER PUBLICATIONS

Office Action, TW App. No. 105139276, dated Aug. 13, 2020, 15 pages (8 pages of English Translation and 7 pages of Original Document).

(Continued)

*Primary Examiner* — Gary W. Cygiel
(74) *Attorney, Agent, or Firm* — NDWE, LLP

(57) ABSTRACT

Systems, methods and apparatuses for distributed consistency memory. In some embodiments, the apparatus comprises at least one monitoring circuit to monitor for memory accesses to an address space; at least one a monitoring table to store an identifier of the address space; and at least one hardware core to execute an instruction to enable the monitoring circuit.

11 Claims, 23 Drawing Sheets

| | MEMORY SIZE GRANULARITY 203 | ADDRESS HASH 205 | TRACKING GRANULARITY 207 | REMOTE SHARER 209 |
|---|---|---|---|---|
| TAG DIRECTORY 201 | CACHE LINE | 0000000000000000 | 4 NODE | 0001 // GROUP 1 HAS IT |
| | CACHE LINE | 0000010000000001 | 4 NODE | 0100 // GROUP 3 |
| | CACHE LINE | 0000100000000010 | 4 NODE | 0111 // GROUP 1 AND 2 |
| | PAGE | 0000000000000000 | ALL | 0000000000000010 // NODE 2 |

(56) References Cited

U.S. PATENT DOCUMENTS

| | | | |
|---|---|---|---|
| 2009/0157970 | A1 | 6/2009 | Kornegay et al. |
| 2010/0138607 | A1 | 6/2010 | Hughes et al. |
| 2011/0087843 | A1 | 4/2011 | Zhao et al. |
| 2011/0153948 | A1 | 6/2011 | Vash et al. |
| 2012/0117334 | A1 | 5/2012 | Sheaffer et al. |
| 2012/0151153 | A1 | 6/2012 | Jantsch et al. |
| 2013/0097385 | A1* | 4/2013 | Beckmann .......... G06F 12/0817 711/128 |
| 2013/0124805 | A1* | 5/2013 | Rafacz ................ G06F 13/1642 711/151 |
| 2013/0243003 | A1 | 9/2013 | Oda |
| 2013/0268711 | A1* | 10/2013 | Safranek ................ G06F 13/16 710/308 |
| 2014/0281180 | A1 | 9/2014 | Tune |
| 2014/0325154 | A1 | 10/2014 | Gray et al. |
| 2014/0379997 | A1* | 12/2014 | Blaner ................ G06F 12/0831 711/146 |
| 2015/0095580 | A1 | 4/2015 | Liu et al. |
| 2016/0179674 | A1 | 6/2016 | Sury et al. |
| 2017/0185518 | A1 | 6/2017 | Guim et al. |

OTHER PUBLICATIONS

European Search Report and Search Opinion Received for EP Application No. 16882624.6, dated Nov. 7, 2019, 13 pages.
Notice of Allowance received for U.S. Appl. No. 14/983,087, dated Sep. 20, 2019 7 pages.
Abandonment from U.S. Appl. No. 16/137,669, dated Jun. 18, 2019, 2 pages.
Non-Final Office Action from U.S. Appl. No. 14/983,087, dated Feb. 26, 2019, 20 pages.
Partial Supplementary European search report for Application No. 16882624.6, dated Jul. 8, 2019, 13 pages.
Final Office Action from U.S. Appl. No. 14/983,087, dated Oct. 3, 2018, 17 pages.
International Preliminary Report on Patentability for Application No. PCT/US2016/069063, dated Jul. 12, 2018, 14 pages.
International Preliminary Report on Patentability for Application No. PCT/US2016/069064, dated Jul. 12, 2018, 11 pages.
International Preliminary Report on Patentability for Application No. PCT/US2016/069066, dated Jul. 12, 2018, 14 pages.
International Search Report and Written Opinion for Application No. PCT/US2016/069063, dated May 30, 2017, 15 pages.
International Search Report and Written Opinion for Application No. PCT/US2016/069064, dated Apr. 17, 2017, 12 pages.
International Search Report and Written Opinion for Application No. PCT/US2016/069066, dated Apr. 13, 2017, 15 pages.
Non-Final Office Action from U.S. Appl. No. 14/983,081, dated Jun. 20, 2017, 7 pages.
Non-Final Office Action from U.S. Appl. No. 14/983,087, dated Feb. 8, 2018, 22 pages.
Notice of Allowance from U.S. Appl. No. 14/983,081, dated Jan. 26, 2018, 13 pages.
Notice of Allowance from U.S. Appl. No. 14/983,081, dated Jun. 8, 2018, 13 pages.
Notice of Allowance from U.S. Appl. No. 14/983,081, dated Oct. 11, 2017, 9 pages.
Requirement for Restriction/Election from U.S. Appl. No. 14/983,087, dated Oct. 12, 2017, 7 pages.
Restriction Requirement from U.S. Appl. No. 14/983,081, dated Mar. 22, 2017, 6 pages.
Allowance Decision of Examination, TW App. No. 105139276, dated Mar. 17, 2021, 3 pages (1 page of English Translation and 2 pages of Original Document).

* cited by examiner

RECEIVING, AT A PROXY OF A NODE, A REQUEST TO START A MONITOR  501
SENDING THE REQUEST TO CORES, CACHING AGENTS, AND OTHER PROXIES WITHIN THE NODE TO INITIALIZE MONITORING OF THE ADDRESS (RANGE)  503
RECEIVING ACKNOWLEDGMENTS FROM THE CORES, CACHING AGENTS, AND OTHER PROXIES (IF APPLICABLE)  505
SENDING AN ACKNOWLEDGMENT TO THE ORIGINATING CORE  507
FIG. 5

RECEIVING, AT A PROXY OF A NODE, A REQUEST TO RELEASE A MONITOR  601
SENDING THE REQUEST TO CORES, CACHING AGENTS, AND OTHER PROXIES WITHIN THE NODE TO STOP THE MONITOR (CLEAR MONITORING TABLE ENTRY)  603
RECEIVING ACKNOWLEDGMENTS FROM THE CORES, CACHING AGENTS, AND OTHER PROXIES (IF APPLICABLE)  605
SENDING AN ACKNOWLEDGMENT TO THE ORIGINATING CORE  607
FIG. 6

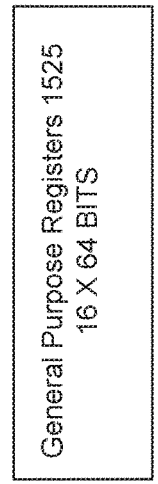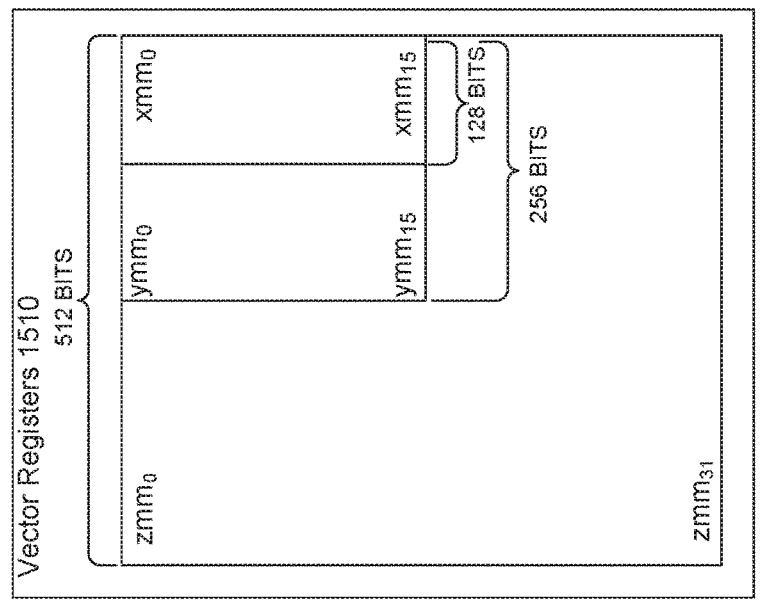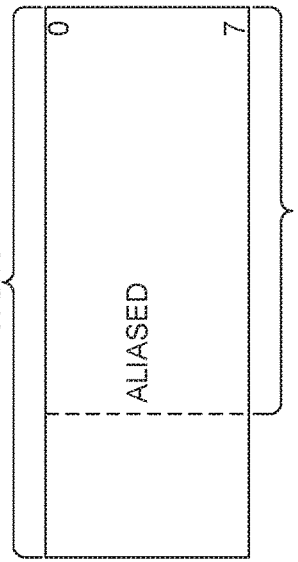
FIG. 15

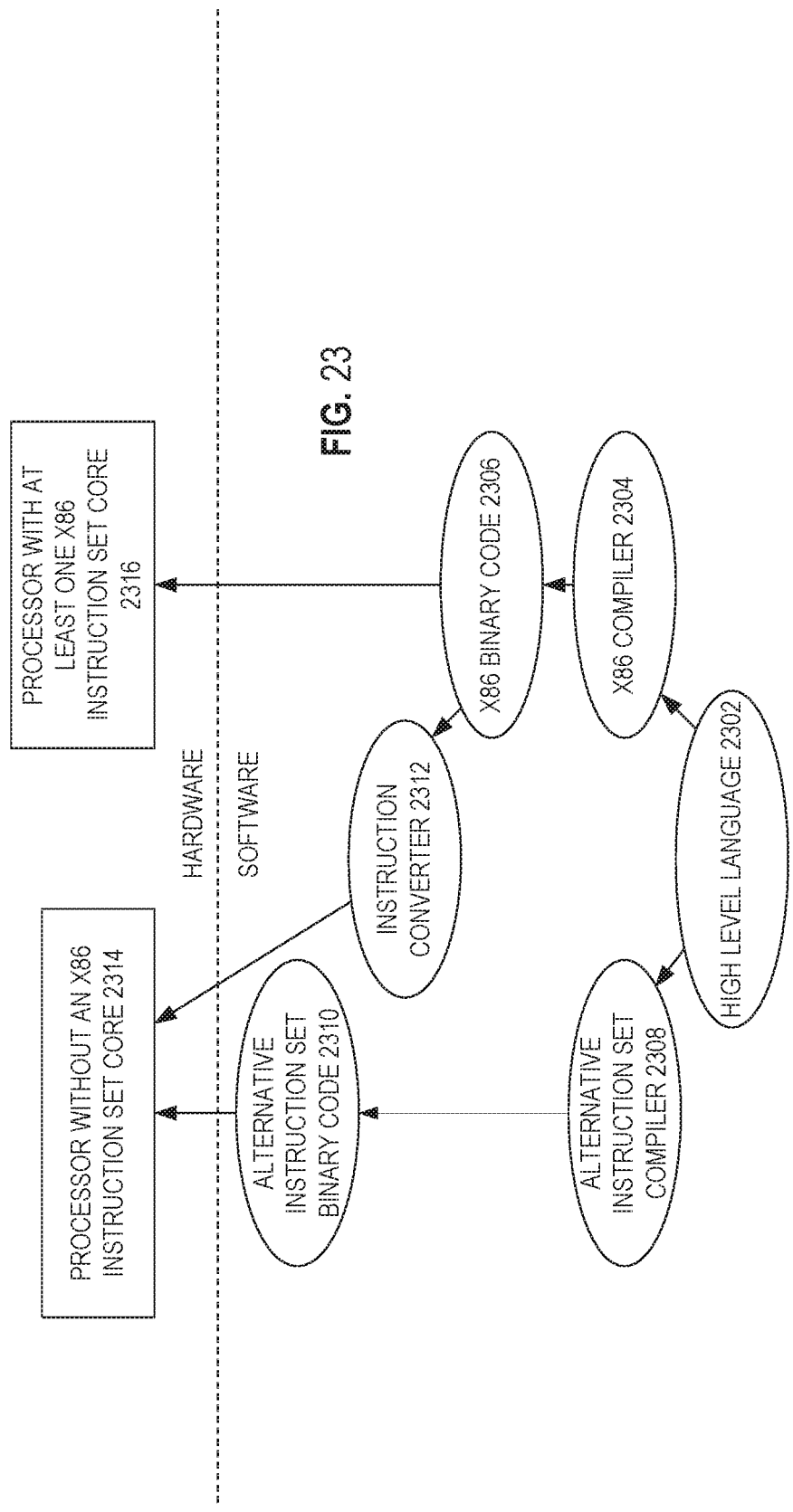

SYSTEMS, METHODS, AND APPARATUSES FOR DISTRIBUTED CONSISTENCY MEMORY

FIELD OF INVENTION

The field of invention relates generally to computer processor architecture, and, more specifically, to instructions which when executed cause a particular result.

BACKGROUND

Extension to instruction set architecture (ISA) provides interfaces for software to work with transactional memory (TM) support. The basic goal is to speed-up multi-threaded workloads by providing hardware schemes that let these workloads execute certain group of operations through lock elision. A commercial example of TM is Hardware Lock Elision (HLE) and Restricted Transactional Memory (RTM).

HLE extensions add two new instruction prefixes, XACQUIRE and XRELEASE. The basic concept is that the thread executes XACQUIRE, an arbitrary stream of instructions plus XRELEASE. Logically, this section can be seen as "lock( ); Instructions( ); unlock( )". Even though one thread may be executing this section, the other threads see this section as free. In case a violation (meaning other threads enter the critical section) is detected by the processor, the inflight transaction is aborted and the thread restarts the instructions stream from the XACQUIRE. All the instructions are committed after XRELEASE are executed with no violation detected.

TSX is a good hardware-based solution to improve software systems that are heavily threaded accessing small but frequently shared streams of address and code. However, this mechanism is applied within a coherent domain (i.e. multi-socket system connected through UPI). With increasing volumes of datasets, transactional software such as databases, need to be able to operate on several shared memory systems over a high speed interconnect, such as a fabric. There may be several 10s of these systems connected via the interconnect, and they will span different coherent domains (a domain could be a single system or a group of systems).

BRIEF DESCRIPTION OF THE DRAWINGS

The present invention is illustrated by way of example and not limitation in the figures of the accompanying drawings, in which like references indicate similar elements and in which:

FIG. 5 illustrates an exemplary embodiment of the use of smonitor on the receiving side;

FIG. 6 illustrates an exemplary embodiment of the use of srelease on the receiving side;

FIG. 15 is a block diagram of a register architecture according to one embodiment of the invention;

FIG. 23 is a block diagram contrasting the use of a software instruction converter to convert binary instructions in a source instruction set to binary instructions in a target instruction set according to embodiments of the invention.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
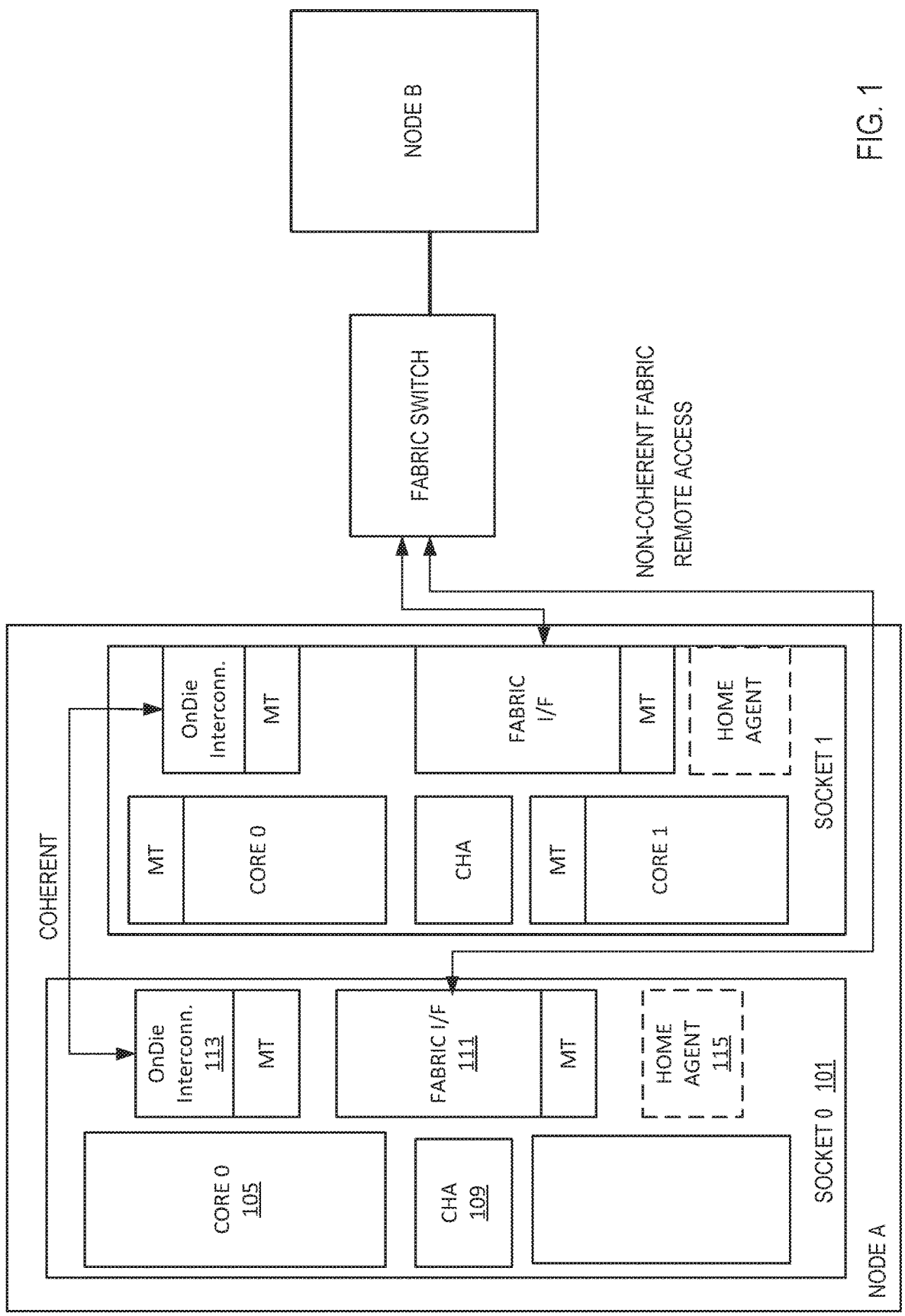
FIG. 1 illustrates an embodiment of a system that supports remote monitoring.

Embodiments of hardware and methods of its use to implement remote address access monitoring are detailed herein. FIG. 1 illustrates an embodiment of a system that supports remote monitoring. A typical socket 101 includes a plurality of processor cores 105, on die interconnect hardware 113, and a fabric interface 111. Remote monitoring may be from socket to socket within a node (through a coherent on die interconnect 113) or between nodes using a fabric switch and a fabric interface 111. As such, depending on the address space that monitor requests are targeting, requests may go to the same node's local memory, they may go the on die interconnect 113 to route the request to the other processors within the same coherent domain, or they may go to processors through a Host Fabric Interface (HFI) 111 that are outside the coherent domain. One system can be composed by one or more coherent domains being all the coherent domains connected through fabric interconnect. For example, high performance computing or data centers are composed by N clusters or servers that can communicate with each other using the fabric. Using the fabric, each coherent domain can expose some address regions to the other coherent domains. However, accesses between different coherent domains are not coherent. In most instances, the fabric allows for mapping address of memory ranges between different coherent domains.

Nodes also typically have caching agents and/or home agents 115. Caching agents are the coherency agents within a node that process memory requests from the cores within the same node. Home agents (HA) are the node clusters that are responsible of processing memory requests from the caching agents and act as a home for part of the memory address space (one die can have multiple Homes having a distributed address space mapping). In this illustration, there is a home agent 115 per socket, however, in some embodiments there is one home agent per node. Further, in some embodiments, the functionality of the home agent is included in the caching agent and called a caching home agent (CHA) as shown as 109. Throughout this description, CHA is typically used for ease in description.

A caching agent (such as CHA 109) is an entity which may initiate transactions into coherent memory, and which may retain copies in its own cache structure. The caching agent is defined by the messages it may sink and source according to the behaviors defined in the cache coherence protocol. A caching agent can also provide copies of the coherent memory contents to other caching agents. A home agent (such as CHA 109 or home agent 115) is an entity which services coherent transactions, including handshaking as necessary with caching agents. A home agent supervises a portion of the coherent memory. A home agent is responsible for managing the conflicts that might arise among the different caching agents. It provides the appropriate data and ownership responses as required by a given transaction's flow.

Further, the home agents include a distributed directory that has the following states for memory addresses: clean (this is the only copy, for example, lines that are just written back), any (any remote socket within the node may have a copy), and invalid (the local socket's cache has a copy). An additional state (remote) indicates that a remote node has requested a copy and may have and may be updated when a request for the line originates from the fabric.

One logical place to add a monitoring scheme is the home agents inside the node, and in some embodiments, that is the case. However, when distributed schemes map address spaces in the HA (node controller, hashing schemes, hemisphere, quadrant schemes, etc.), this may add too much complexity in terms of design, area and validation. As such, in some embodiments, this monitoring information is kept as a monitoring table (MT) 103: 1) in the proxies to the node, that tunnel any memory transaction coming from other nodes to the home node (fabric interface 111), 2) the cores inside the node 105, and 3) the unique agents that can access the local memory without going through the proxies (on die interconnect 113), to identify accesses. This table is used by a monitor circuit (not shown) which tracks memory/cache accesses, compares those accesses to the table, and alerts the originating core of any accesses as requested.

In some embodiments, a distributed memory monitoring scheme allows the core to register at the home nodes to monitor the address range of interest. The monitoring scheme allows for discovering when a given line that is accessed by other caching agents in the system falls within the specified address range; accordingly, it updates the sharer's valid bits for the given range. The core that requests the tracking for the address range uses a tag directory structure 107 to denote the sockets in the cluster that have access to the specific address range and is used by the core to track/monitor the address range.

This directory is a non-perfect tag directory in two dimensions. First, given that the whole system can have a very large address space, different addresses can match in the same tag entry (explained below). Second, each bit in the sharer's remote tracking information (e.g., bit mask or bloom filter) corresponds to a group of caching agents in the system. Filtering hardware associated with the tag directory per core performs Bloom or other filtering to test inclusion in a set.

Figure 2:
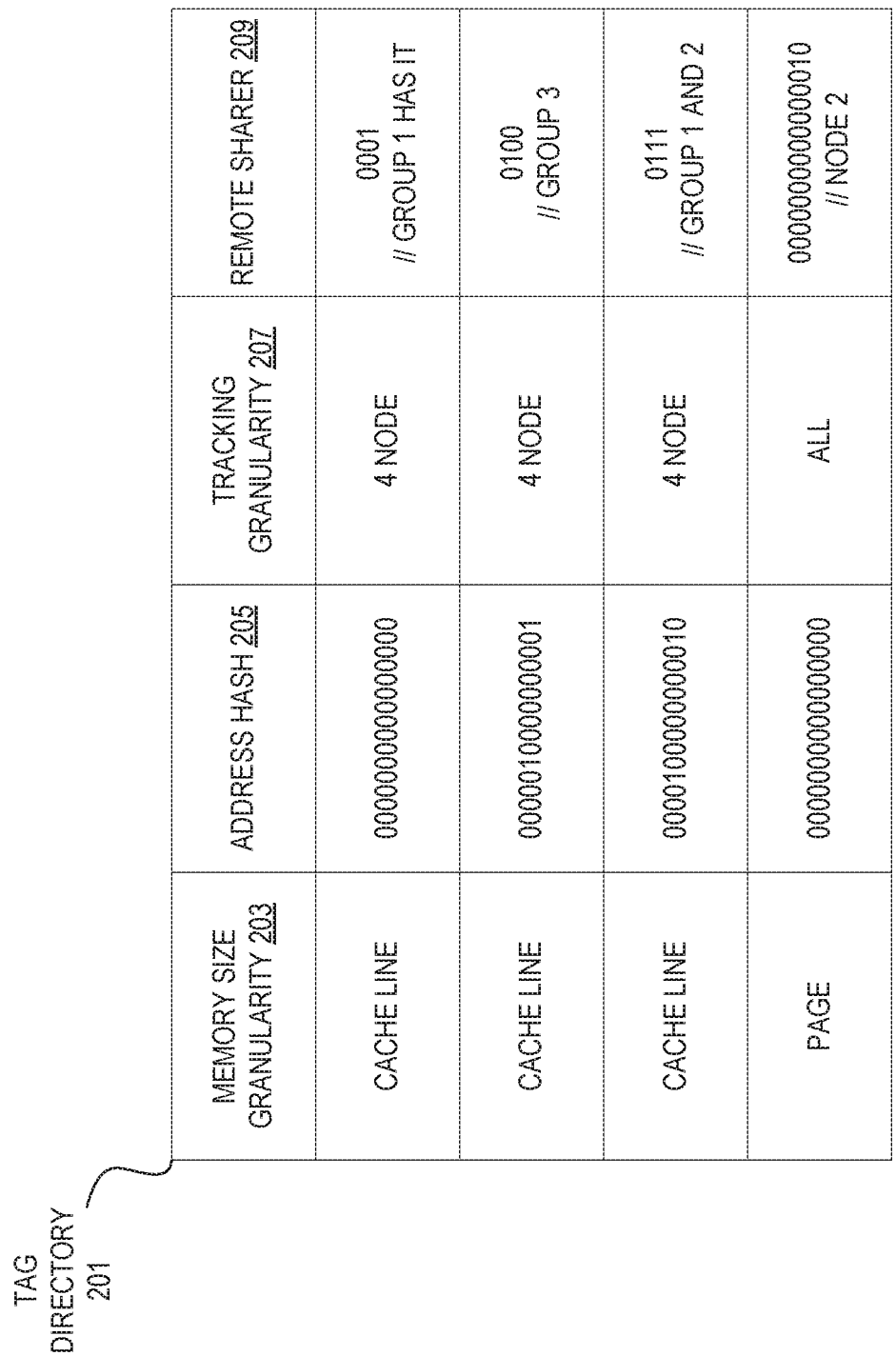
FIG. 2 illustrates an embodiment of the tag directory.

FIG. 2 illustrates an embodiment of the tag directory. An entry in the tag directory 201 includes fields for tracking size granularity 203, address hash 205, tracking granularity 207, and remote sharer information 209.

The tracking size 203 and tracking granularity 207 can be provided through a mcoherent call as detailed above. As such, the number of rows in the directory can be reduced using page-level or huge page level tracking instead of cache line tracking.

As a simplified example, assume a hypothetical cluster of 8 nodes, 2 sockets each and consider each node has only 4 MB of memory (65K lines of 64 B each). Now there are 65K row entries in the look-up-directory, each corresponding to a line in the node. In this scenario, the 16 bit bit-mask accurately tracks the sockets which have requested memory from this node. However, in reality, systems have much, much larger memory and the space requirements for the look-up-directory can quickly become impractical. For this reason, the directory non-perfect.

Bloom filtering, or node groups, or a subset of nodes 209 instead of the bit mask to reduce the space complexity for the directory.

In order to provide scalability, in some embodiments, cache line addresses 205 are hashed onto rows in the directory using a hash function H( ), note that number of rows is less than the number of cache lines. A good choice of H( ) can result in fewer collisions, for example, using lower-order bits of the cache line address ensures good distribution for the hashing function. Note that having collisions does not mean any loss of correctness; it merely indicates potential false positives: since two cache lines map onto the same row in the directory, we will end up snooping the union of the "remote nodes" for the two cache lines.

With the choice of a good hash function, and the use of the distributed directory bits (the tag directory need only be consulted if the distributed directory bit for the cache line says "remote") the probability of false positives becomes small. At the same time, the number of nodes requiring snoops is significantly reduced. As mentioned earlier, further tradeoffs are possible by varying the granularity of hashing, and using bloom filter tracking instead of a bit-mask based on hints specified by the application Software has the ability to reset the entries corresponding to a memory region in the look-up-directory based on usages with the srelease (detailed herein), and this ensures the number of false positives of the directory does not monotonically increase over time (since a bloom filter based approach becomes less effective as the filter becomes fully populated—recall it only tells for sure if something is not present—and this reduces the search space). Further, at points when coherence needs to be enforced, software can consult the directory structure and explicitly issue remote snoop, write-back, or invalidate commands.

Each proxy and core can contain a fixed number of monitors, and each monitor contains the address range and original home requesting the monitor. If there are no free entries in the monitors, then that monitoring request fails. The request would also fail if the address range being requested overlaps with another monitoring entry. In a case of failure, a fail response would be sent back to the originator fabric and it would be communicated to the software stack. Eventually, the software would get notified in case of failure and it would need to take corresponding actions. A different way to propagate the failure to the software stack could be issuing a callback to the software stack from the core.

To allow monitoring a given address range which is being monitored by a given core, in some embodiments instructions and messages for monitor initialization (smonitor) and monitor release (srelease) are supported by processor cores. These instructions provide a new interface that allows a software thread to specify that a given set of instructions is bound to a specific type of access to a certain memory range. Any access to this address space performed by any other thread (in or outside the coherent domain) in the specified mode will be automatically notified to the software stack. From this point, the software stack is the one responsible of taking a specific action (for example, restart the copy of the monitored object).

An embodiment of the smonitor and srelease instructions are:
SMONITOR base_address, granularity, mode, size
SRELEASE The semantic of SMONITOR is the following, the thread provides a base line address, the granularity of address space that needs to be monitored, the monitoring mode, and size. The granularity can be, for example, a cache line, memory line, KB, MB or GB (for example, coded as: 0, 1, 2, 3, 4). The size specifies the multiple of the granularity space that needs to be monitored. The mode specifies what type of violation is being monitored read (R) or write (W) (for example, W mode would imply that the thread will get notified if the address region is accessed with a write operation). The following example shows a way to bind instructions within a transaction to the address space corresponding to [300000, 300000+4 MB], but only in write mode (for this example, assume Core X in node A is executing this instruction): SMONITOR 300000, 3, W, 4. The execution of SMONITOR causes a SMONITOR message to be sent from the initiating (originating) core to its local caching agent to be propagated to the remote cores, etc. to set up monitoring (e.g., monitor table(s)). In some embodiments, the monitoring table for the executing core is also set (for example, when the information in the monitoring table is duplicated across cores, proxies, etc. in nodes).

The execution of SRELEASE stops the monitor(s) and removes an associated monitor table.

Figure 3:
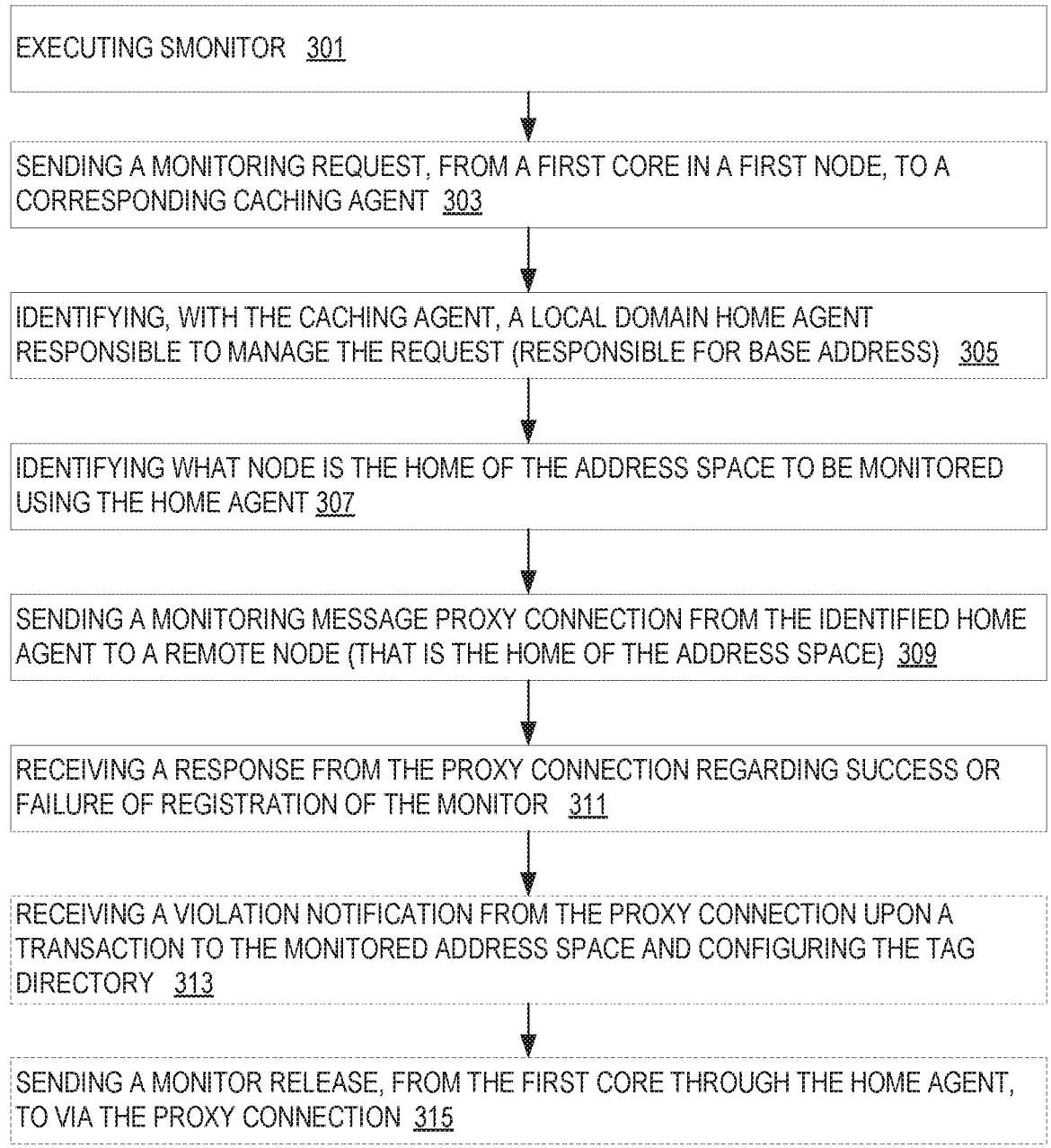
FIG. 3 illustrates an exemplary embodiment of the use of smonitor.

FIG. 3 illustrates an exemplary embodiment of the use of smonitor. At 301, a first core (originating core) in a first node, executes an smonitor instruction. For example, in FIG. 1, core 0 105 executes a smonitor instruction.

This execution causes a monitoring request (smonitor message) to be sent from the first core to its corresponding caching agent at 303. This request includes the information (base address, granularity, size, and mode) from the instruction. The caching agent manages the baseline address to setup the requested monitor. This caching agent is separate from the home agent depending upon the implementation. For example, in FIG. 1, the core 105 sends a request to CHA 109 (combined caching and home agent). In other words, the core alerts the caching agent of the address (AS) that it wants monitored [base_address to base_address+granularity*size] and the type of monitoring (write/read).

At 305, in some embodiments, the caching agent identifies a local domain home agent responsible to manage the request. For example, the home agent responsible for the base address. Note that the identified home agent may be combined in the same entity (CHA) as the caching agent as detailed above.

The identified home agent identifies what node in the system is the home for the address space that the core (thread) wants to monitor (it can be the local coherent domain) at 307.

Once the home for the address region is identified, a request is sent to the proxy (in the illustration of FIG. 1 the fabric 111 or on die interconnect 113) to setup a monitor in the home node at 309. In other words, a monitoring message proxy connect (smonitor message) is sent from the identified home agent to a remote node which is the home of the address space at 309. Note that the node can belong to a different coherent domain and use the fabric, or it could be within the same coherent domain. In that case the proxy would be a on die interconnect.

A response from the proxy connect regarding the success or failure of the registration of the monitor is received by the originating core at 311. Examples of what may cause a failure include, but are not limited to, overlapping address spaces, no free monitor space, and hardware failure. If the monitor(s) is/are successful, then the tag directory for the core is updated. Further, in most embodiments, a monitoring table is updated across all proxies in the socket upon an acknowledgment of one or more monitors being configured.

Figure 4:
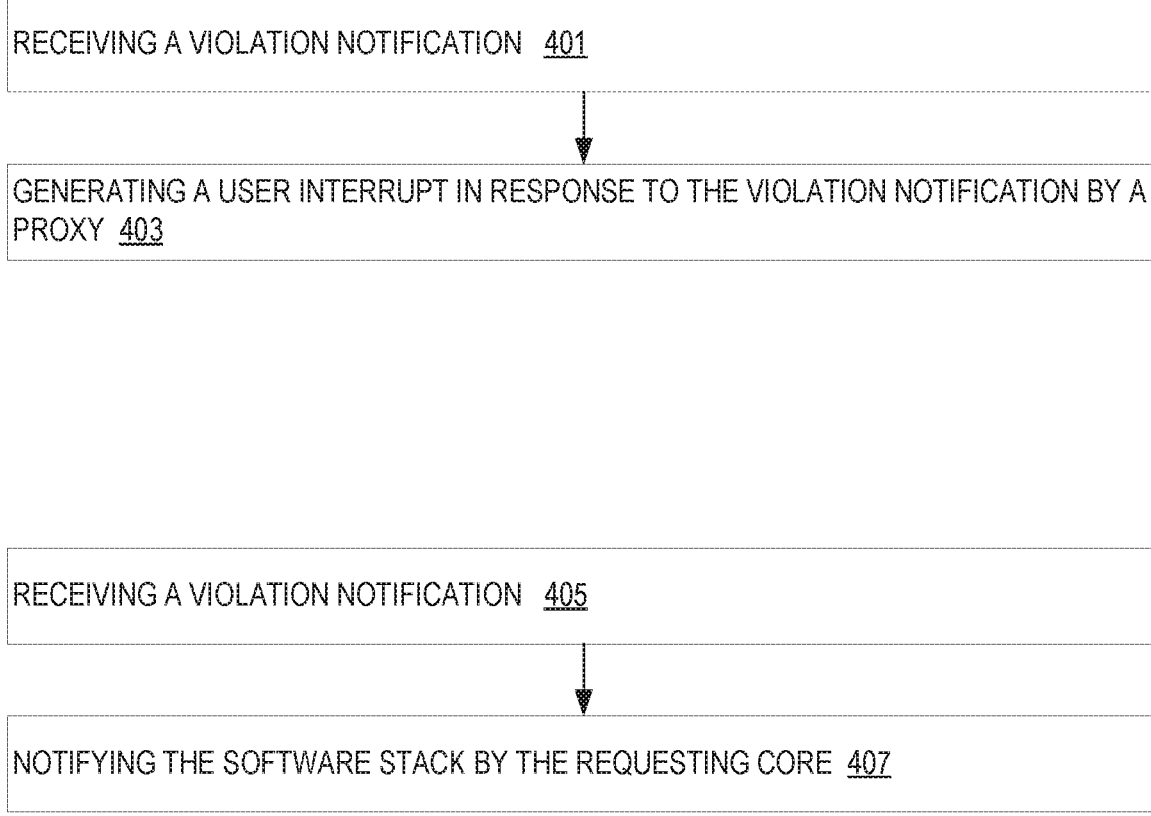
FIG. 4 illustrates two embodiments for handling a remote monitoring violation.

After registration, in some embodiments, a notification of a violation upon a transaction to the monitored address space is received at 313. For example, a remote monitor processes a write to the monitored address. This may be received by the core or a proxy. FIG. 4 illustrates two embodiments for handling a remote monitoring violation. At 401, a violation notification is received by the core. This causes the core to generate a user interrupt at 403.

Alternatively, at 405, a violation notification is received by the core. This causes the core to notify the software stack at 409. In either case, the software stack is the responsible to take the proper actions to address the failure.

In case of success, where all the different operations are executed without a violation the requesting core, a monitor release (de-registration) is sent from the first core to the monitoring proxies at 313. For example, the core executes a srelease instruction to release the monitors and once the release instruction is executed the core notifies the release to the remote proxy (HFI of Socket B in the example). The proxy propagates the release notification to the real home for this monitor and cores.

FIG. 5 illustrates an exemplary embodiment of the use of smonitor on the receiving side. At 501, a proxy of the receiving node receives a request to start a monitor. In other words, a monitoring message proxy connect (smonitor message) is received at the remote node which is the home of the address space. Note that the node can belong to a different coherent domain and use the fabric, or it could be within the same coherent domain. In that case the proxy would be an on die interconnect.

This request is sent to cores and proxies at 503.

Acknowledgements from the cores and proxies regarding the request is received by the receiving proxy (e.g., fabric) at 505. For example, is the monitor successfully setup or not. These acknowledgments typically include an identifier of the responder.

These acknowledgments are processed by the proxy into a single acknowledgment which is sent to the originating core at 507. The acknowledgment to the originating core includes identifiers of where monitoring is taking place.

FIG. 6 illustrates an exemplary embodiment of the use of srelease on the receiving side. At 601, a proxy of the receiving node receives a request to release a monitor. In other words, a monitoring message proxy connect (srelease message) is received at the remote node which is the home of the address space at 309. Note that the node can belong to a different coherent domain and use the fabric, or it could be within the same coherent domain. In that case the proxy would be an on die interconnect.

This request is sent to cores and proxies such as on die interconnects at 603.

Acknowledgements from the cores and proxies regarding the request is received by the receiving proxy (e.g., fabric) at 605. These acknowledgments typically include an identifier of the responder.

These acknowledgments are processed by the proxy into a single acknowledgment which is sent to the originating core at 607. The acknowledgment to the originating core includes identifiers of where monitoring is taking place.

Figure 7:
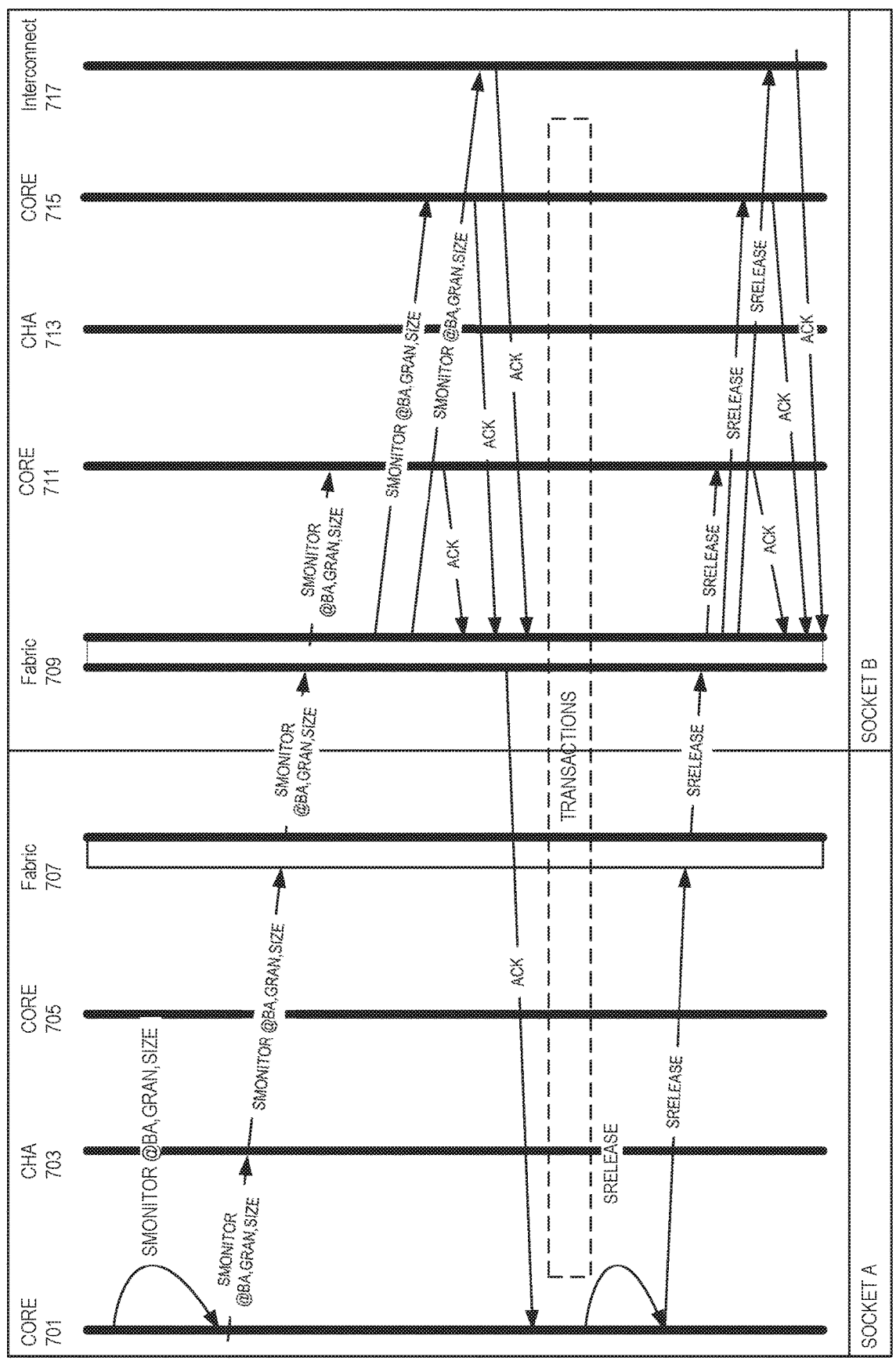
FIG. 7 illustrates an example of an initialization and finalization flow using smonitor and srelease.

FIG. 7 illustrates an example of an initialization and finalization flow using smonitor and srelease. An initiating core 701 decodes and executes a smonitor instruction. For example, a thread on core 701 executes an smonitor instruction. This instruction provides a base address, granularity of the space to be monitored (e.g., memory line, KB, MB, or GB), the size, and the mode.

The core 701 in Node A sends a request to the local caching agent managing the baseline address (CHA: CA+HA) in order to setup a monitor. The core 701 notifies the CHA that it wants to monitor the address space (AS) where AS=[@base_address to base_address+ granularity*size].

The CHA 703 identifies to what home (such as a socket) the specified memory region is mapped. In some embodiments, if the region belongs to several homes the instruction is aborted. The CHA 703 identifies what is the home agent in the local coherent domain that is responsible to manage the request the address (base_address). The home agent (CHA 703) identifies what node (socket) in the system is the Home for the address space that the thread wants to monitor (it can be the local coherent domain).

The CHA 703 sends a monitoring message proxy connection fabric 707 to send to the remote node acting as a Home for AS. On the target side, the proxy generates a multicast message that targets including proxies to the socket such any on die interconnect agent in the node 717 and any fabric interconnect agent 709 in the node and all the cores 711 and 715 in the home socket.

All the target destinations respond success or failure about the registration of the monitor with acknowledgement messages. Typically, the responses will be collapsed by the proxy in the home node that received the monitoring request (in this example fabric 709). In case of failure it will propagate the notification to the requestor and will cancel the registration to the rest of peers inside the home node.

In case that any proxy agent or core identifies a transaction to the address space violating the requested monitoring AS, they will send a violation message to the core 701 notifying it of the violation. The core 701 propagates the violation to the user space.

When there are no issues, or there has been a violation detected, the core 701 will send a de-registration message once a srelease instruction is decoded and executed alerting the proxies that the core does not need more monitoring on AS. Once the release instruction is executed the Core notifies the release to the remote proxy (fabric 709). The proxy 709 propagates the release notification to the real home for this monitor and cores. Note that the core 701 would know the proxy identifier because of the acknowledgement received in the registration process detailed earlier.

As hinted at above, there may be times when there is a conflict detected by a monitor. For example, after initialization (detailed in the first portion of FIG. 3 as the handling of smonitor), an originating core may issue remote read or write operations to be handled in a remote node into the address space that is being monitored on behalf of the originating core. This will not cause a conflict. However, when a different entity (another core for example) issues a write operation to the monitor space, then a conflict has occurred. The entity that makes this detection is the one that cause the access to occur. This entity checks its copy of the monitor table (using, for example, its monitor circuitry) to see if the memory address of the access is associated with a monitor. The entity making the conflicting access sends a notification of the access to the originating core. The notification may be fabric or interconnect based depending upon the configuration of the entities. The originating core then handles the violation as detailed earlier. Note that all instructions during the monitoring are typically committed as they are executed.

Figure 8:
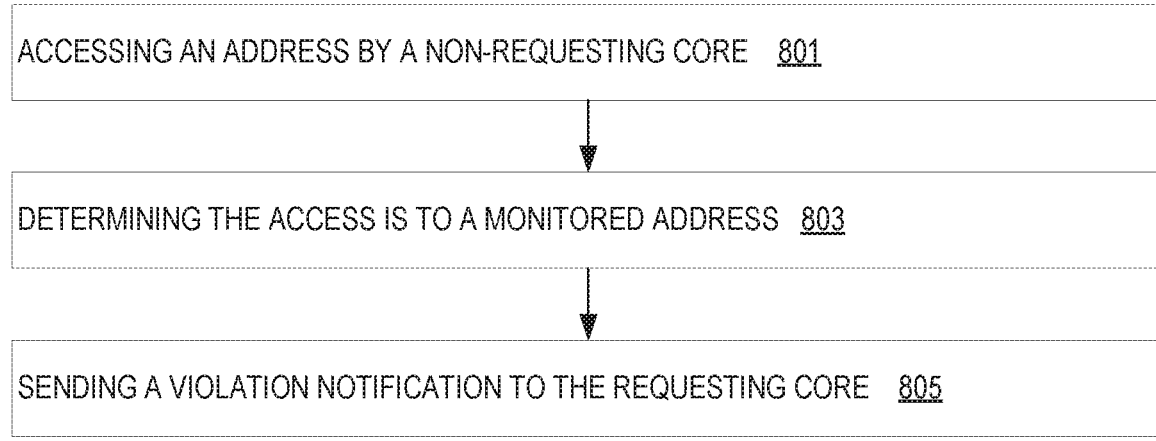
FIG. 8 illustrates an embodiment of a method for handling conflicts by a core that did not request a monitor (non-originating core)

FIG. 8 illustrates an embodiment of a method for handling conflicts by a core that did not request a monitor (non-originating core). At 801, the non-originating core writes or reads (accesses) a memory or cache address.

A determination that the access is to a monitored address, and is of the type of access being monitored, is made at 803. For example, a determination that a write (type of access) to an address in a monitored address space is made. Of course, accesses to addresses not being monitored, or accesses to addresses being monitored, but not of the type being monitored, do not result in a conflict.

At 805, the non-originating core sends a violation notification to the core that requested the monitor. This notification may go through a fabric or interconnect interface depending upon how the cores are arranged.

Figure 9:
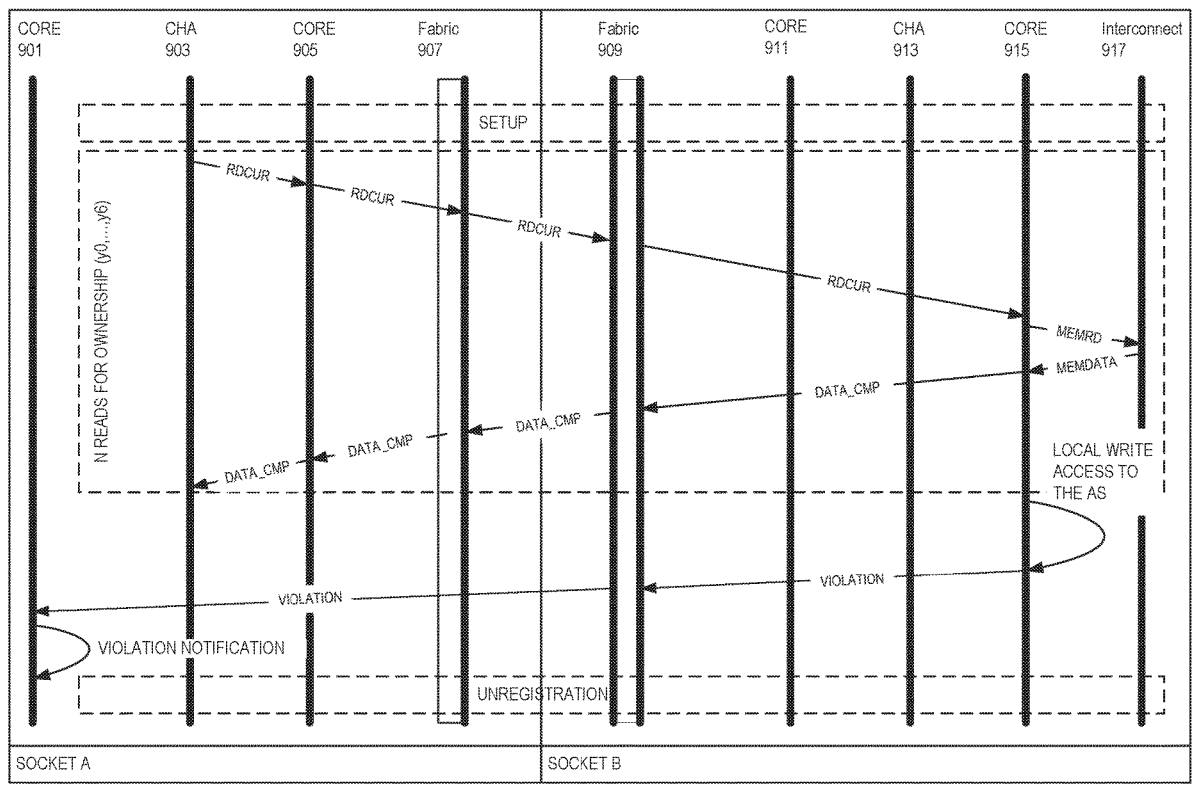
FIG. 9 illustrates an example of handling a conflict. In this example, setup (smonitor) has already occurred.

FIG. 9 illustrates an example of handling a conflict. In this example, setup (smonitor) has already occurred. Additionally, several remote reads (RdCur and MemRd) have occurred and data returned (Data_Cmp) without any conflicts. However, core 915 writes to the monitored address space which is a violation. Core 915 then sends a notification to the originating core 901 through its fabric interface 909. The proxy 909 propagates notication to the originating core 901 for it to handle. After the notification, the monitor is typically not needed and the originating core triggers a release of the monitor (mrelease).

The remote monitoring discussion above may also be applied to transactional memory (TM)/hardware lock elision (HLE). As detailed above, in HLE, the basic concept is that a thread executes an instruction to delineate the start of a transaction (e.g., XBEGIN or XACQUIRE), executes an arbitrary stream of instructions of the transactions, and then commits the instructions of the transaction upon an end of the transaction (e.g., upon an execution to end the transaction such as XRELEASE or XEND). Logically, this section can be seen as "lock( ); Instructions( ); unlock( )". Even though one thread may be executing this section, the other threads see this section as free. A violation (meaning other threads enter the critical section) is detected by the processor, the inflight transaction is aborted and the thread restarts the instructions stream from the start delineation instruction. All the instructions are committed after the release instruction is executed with no violations detected. HLE is a good hardware-based solution to improve software systems that are heavily threaded accessing small, but frequently shared streams of address and code. While this mechanism is applied within a coherent domain (such as a multi-socket system connected through a on die interconnect) with increasing volumes of datasets, transactional software such as databases, will need to be able to operate on several shared memory systems over a high speed interconnect, such as a fabric. There may be several tens of these systems connected via the interconnect, and they will span different coherent domains (a domain could be a single system or a group of systems).

HLE functionality is extendable to shared-memory systems connected through high speed interconnects by binding the execution of operations on a specified address range based on conditions specified by the application. The specified address range can be local to the coherent domain or mapped to a remote address space.

HLE can be extended by having an application specify a memory region; in case any other hardware thread within the same or remote coherent domain accesses this memory region such that there is a data conflict, the application will be notified to that a violation has happened and at what precise memory location happened. Detecting when access to specific ranges of memory occurs between a set of instructions can be made by registering monitors at the proper places of the system. Memory monitoring can occur across all the server platforms in the data centers that can be connected via coherent protocols or via fabric interconnect. For example, one thread in server A wants to copy an object from server B. In this case, no locking schemes are used. However, the thread in server A would be notified in the case that, in the middle of the copy, the object has been modified by any other thread in the system. The action to be taken upon receiving the notification is left to the application software. Additionally, traditional transactional memory execution of all or nothing commit is used. The memory instructions inside the transaction are all committed or none of them in case of a violation.

There are three basic scenarios that could occur in this HLE extention. First, the address space is accessed by other agents in the specified mode. That would imply that the transaction has been violated. Second, no access is done. That would imply that the xmonitor has been successfully executed. Finally, any other type of failure occurs. For example, remote nodes fail or a time out occurs. When an error, similar to registration failure of smonitor, the originating core will trigger a user interrupt to notify the occurred error. At this point, the software stack is the responsible to take the proper actions to address the failure.

Unlike the non-HLE approaches, any access to this address space performed by any other thread (in or outside the coherent domain) will restart the stream of instructions. The proposed feature would be an extension of the discussed previously.

Monitoring in HLE is provided through two instructions, according to an embodiment.
SXACQUIRE base_address, granularity, mode, size
SXRELEASE The semantic of SXACQUIRE is the following, the thread provides a base line address, the granularity of address space that needs to be monitored, the monitoring mode, and size. The granularity can be, for example, memory line, KB, MB or GB (for example, coded as: 0, 1, 2, 3, 4). The size specifies the multiple of the granularity space that needs to be monitored. The mode specifies what type of violation is being monitored read (R) or write (W) (for example: W mode would imply that the thread will get notified if the address region is accessed with a write operation). The following example shows a way to bind the instructions within the transaction to the address space corresponding to [300000, 300000+4 MB] but only in write mode (for this example assume Core X in node A is executing this instruction): SXACQUIRE 300000, 3, W, 4. The execution of SXACQUIRE causes a SXACQUIRE message to be sent from the initiating (originating) core to its local caching agent to be propagated to the remote cores, etc. to set up the monitoring (e.g., monitor table) and buffer stores of the transaction. In some embodiments, the monitoring table for the executing core is also set (for example, when the information in the monitoring table is duplicated across cores, proxies, etc. in nodes).

The execution of SXRELEASE stops the monitor, removes associated monitor table(s) and commits buffered instructions of the transaction.

The set of instructions in the transaction will succeed unless another thread in the data center (in any of the sockets of the system, irrespective of coherent domain) accesses the specified region and causes a data conflict. To implement the proposed transactional semantic, all the write memory operations issued by the requested node targeting the memory in the monitored address range are temporary allocated in an intermediate buffer. If a violation is identified this buffer is cleared. Otherwise, the intermediate buffer will be dump in to memory on SXRELEASE. The intermediate buffer is placed in a memory controller associated with the remote node according to an embodiment. In other embodiments, the intermediate buffer is a part of an interface (fabric or interconnect) that receives the stores.

Figure 10:
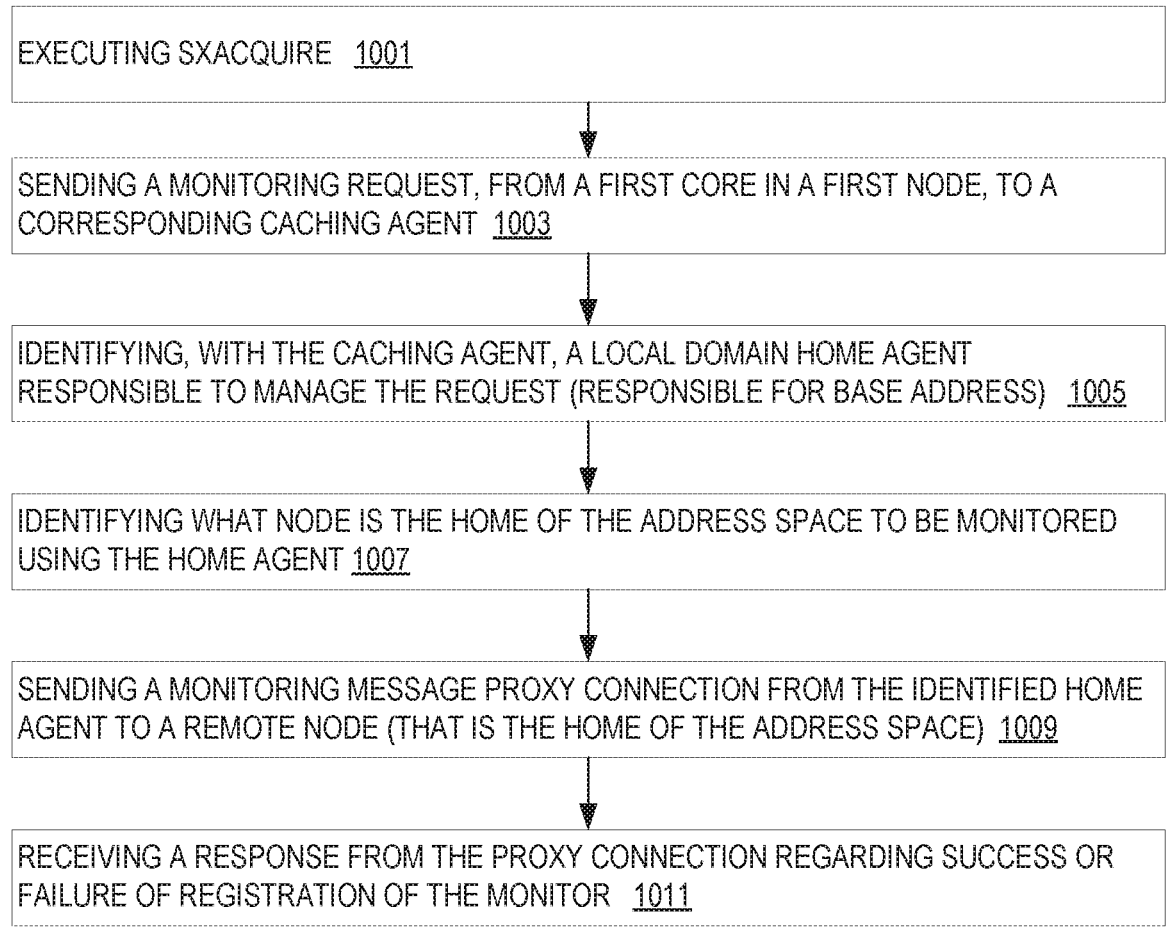
FIG. 10 illustrates an exemplary embodiment of the use of a transactional memory monitor.

FIG. 10 illustrates an exemplary embodiment of the use of a transactional memory monitor. At 1001, a first core (originating core) in a first node, decodes and executes a SXACQUIRE instruction. For example, in FIG. 1, core 0 105 executes a SXACQUIRE instruction.

This execution causes a monitoring request (SXACQUIRE message) to be sent from the first core to its corresponding caching agent at 1003. This request includes the information (address, granularity, size, and mode) from the instruction. The caching agent manages the baseline address to setup the requested monitor. This caching agent is separate from the home agent depending upon the implementation. For example, in FIG. 1, the core 105 sends request to CHA 109 (combined caching and home agent). In other words, the core alerts the caching agent of the address (AS) that it wants monitored for the transaction ([@base_address to base_address+granularity*size]) and the type of monitoring (write/read).

At 1005, in some embodiments, the caching agent identifies a local domain home agent responsible to manage the request. For example, the home agent responsible for the base address. Note that the identified home agent may be combined in the same entity (CHA) as the caching agent as detailed above.

The identified home agent identifies what node (socket) in the system is the home for the address space that the core (thread) wants to monitor (it can be the local coherent domain) at 1007.

Once the home for the address region is identified, a request is sent to the proxy (in the illustration of FIG. 1 the fabric 111 or on die interconnect 113) to setup a monitor in the home node at 1009. In other words, a monitoring message proxy connect (SXACQUIRE message) is sent from the identified home agent to a remote node which is the home of the address space at 1009. Note that the node can belong to a different coherent domain and use the fabric, or it could be within the same coherent domain. In that case the proxy would be an on die interconnect.

A response from the proxy connect regarding the success or failure of the registration of the monitor is received by the originating core at 1011. Examples of what may cause a failure include, but are not limited to, overlapping address spaces, no free monitor space, and hardware failure. If the monitor(s) is/are successful, then the tag directory for the core is updated. Further, in most embodiments a monitoring table is updated across all proxies in the socket upon an acknowledgment of one or more monitors being configured.

Figure 11:
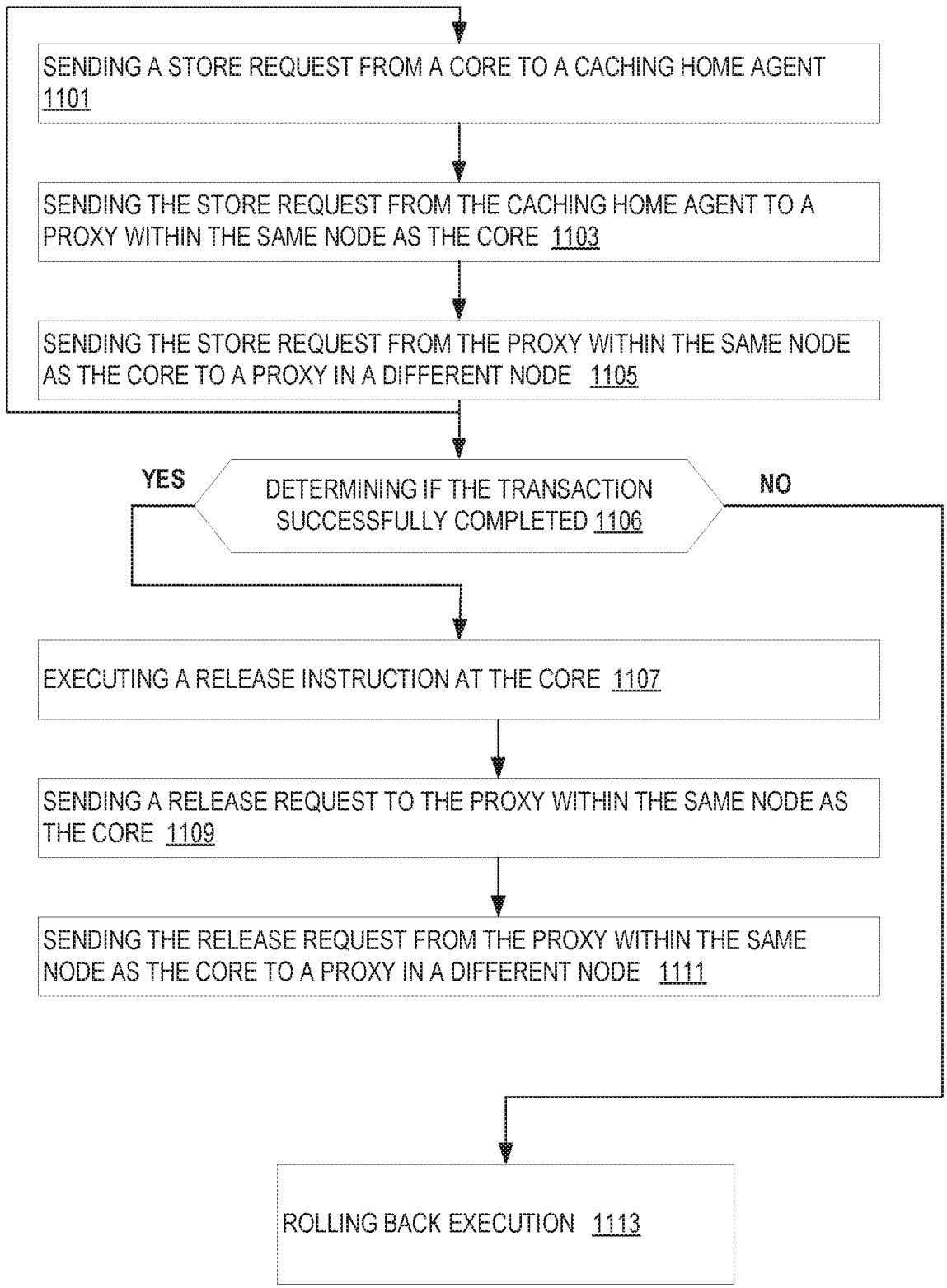
FIG. 11 illustrates an embodiment of a method for extending monitoring to a transaction.

FIG. 11 illustrates an embodiment of a method for extending monitoring to a transaction. It is assumed that prior to any of the below detailed actions, that one or more monitors have been started (such as by an SXACQUIRE instruction execution).

At 1101, a store request from core is sent to a caching agent, home agent, or caching home agent. For example, CHA 109 receives the store request from core 0 105. The store request is then forwarded from the caching agent, home agent, or caching home agent to proxy within the same node as the core (e.g., fabric 111 or on die interconnect 113) at 1103.

The proxy then sends the store request to a proxy in a different node or socket as the core at 1105. For example, the store request is sent to a different node via a fabric interface 111. 1101-1105 are repeated for each store request of the transaction. Each of these store requests is to be buffered by the receiving node until the transaction is complete.

A determination of if there have been any transaction violations (such as a write into the monitored address space) is made at 1106. In other words, has the transaction completed successfully? If not, then the buffered stores are flushed and not committed, and the execution state is rolled back to SXACQUIRE at 1113.

If there are no issues within the transaction (no accesses to the monitored address space), then the core executes SXRELEASE at 1107 and sends a release request to the proxy within the same node as the core at 1109.

This release is sent from the proxy to a proxy in the remote node at 1111 to cause all of the buffered stores to be committed.

Figure 12:
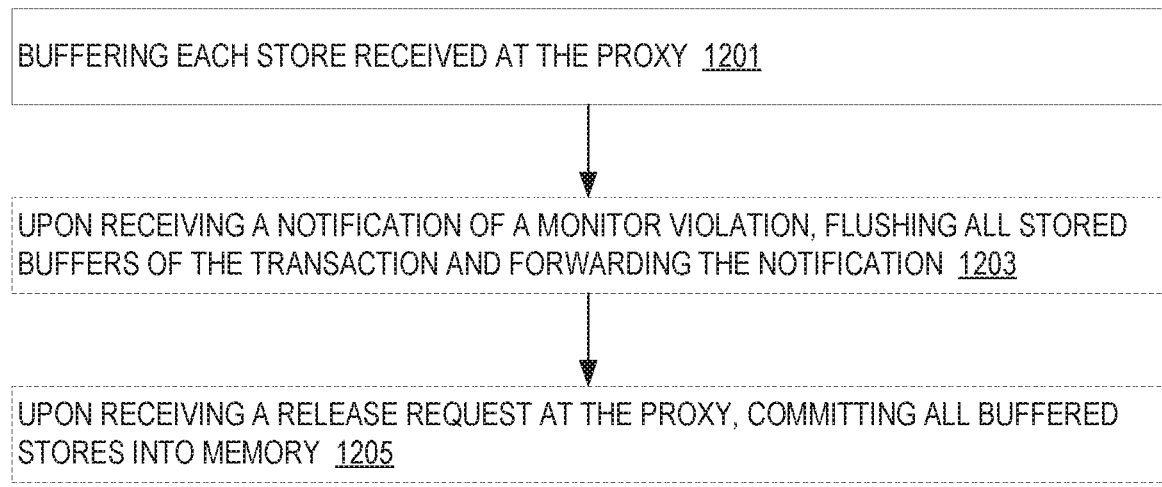
FIG. 12 illustrates an embodiment of a method for transactional monitoring at a receiver node proxy.

FIG. 12 illustrates an embodiment of a method for transactional monitoring at a receiver node proxy. At 1201 each store that is received from the core that requested the transaction monitoring is buffered.

When there are monitor violations, upon receiving a violation notification, flushing all stored buffers of the transaction and forwarding notification at 1203.

When there are no violations and the transaction successfully completes, receiving a release request (SXRELEASE) and committing all buffer stores into memory at 1205. The monitors are also reset.

Figure 13:
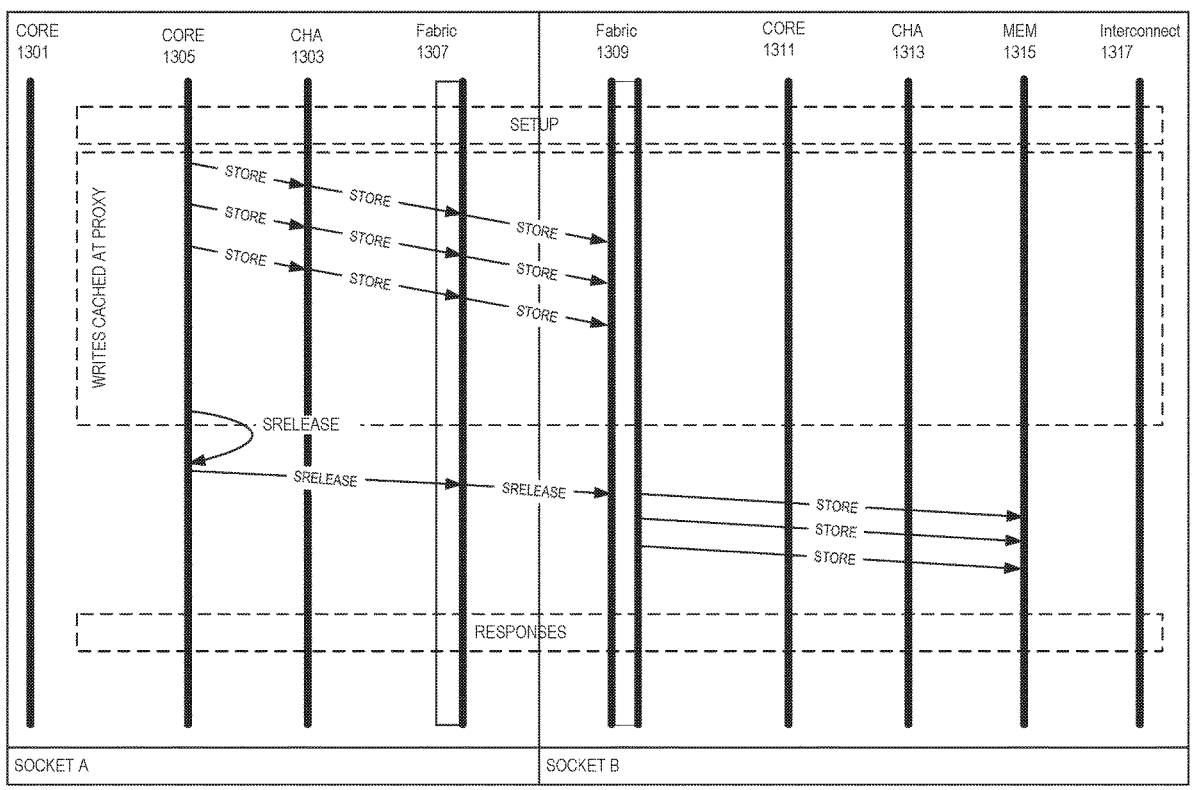
FIG. 13 illustrates an example of an extension of monitoring for a transaction.

An example of an extension of monitoring for a transaction is shown in FIG. 13.

Figure 14:
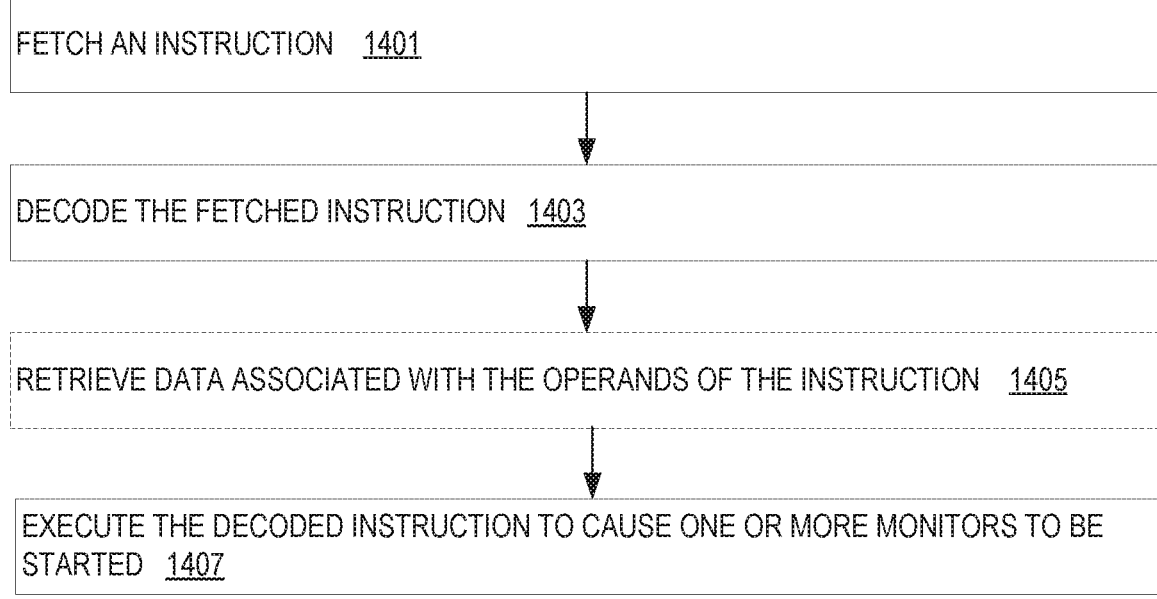
FIG. 14 illustrates an embodiment of a method for processing a monitor instruction by a processing core.

FIG. 14 illustrates an embodiment of a method for processing a monitor instruction by a processing core. For example, the monitor instruction may be the SMONITOR or SXACQUIRE instructions detailed earlier.

At 1401, the instruction is fetched. For example, the instruction is fetched from an instruction cache or other memory structure. The instruction includes operands for base address, granularity, size, and mode as detailed above.

At 1403, the fetched instruction is decoded by decode circuitry.

At 1405, data associated with the operands of the instruction is retrieved as needed. For example, registers are accessed for their data.

The decoded instruction is executed by execution circuitry (a functional unit) at 1407 to cause one or more monitors to be started (if possible).

Embodiments detailed above may be implemented in several different architectures and systems. Detailed below are exemplary architectures and systems to implement the above.

Exemplary Register Architecture

FIG. 15 is a block diagram of a register architecture 1500 according to one embodiment of the invention. In the embodiment illustrated, there are 32 vector registers 1510 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15.

In other words, the vector length field QAB59B selects between a maximum length and one or more other shorter lengths, where each such shorter length is half the length of the preceding length; and instructions templates without the vector length field QAB59B operate on the maximum vector length. Further, in one embodiment, the class B instruction templates of the specific vector friendly instruction format QAC00 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1515—in the embodiment illustrated, there are 8 write mask registers (k0 through k7), each 64 bits in size. In an alternate embodiment, the write mask registers 1515 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1525—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1545, on which is aliased the MMX packed integer flat register file 1550—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

Figure 16:
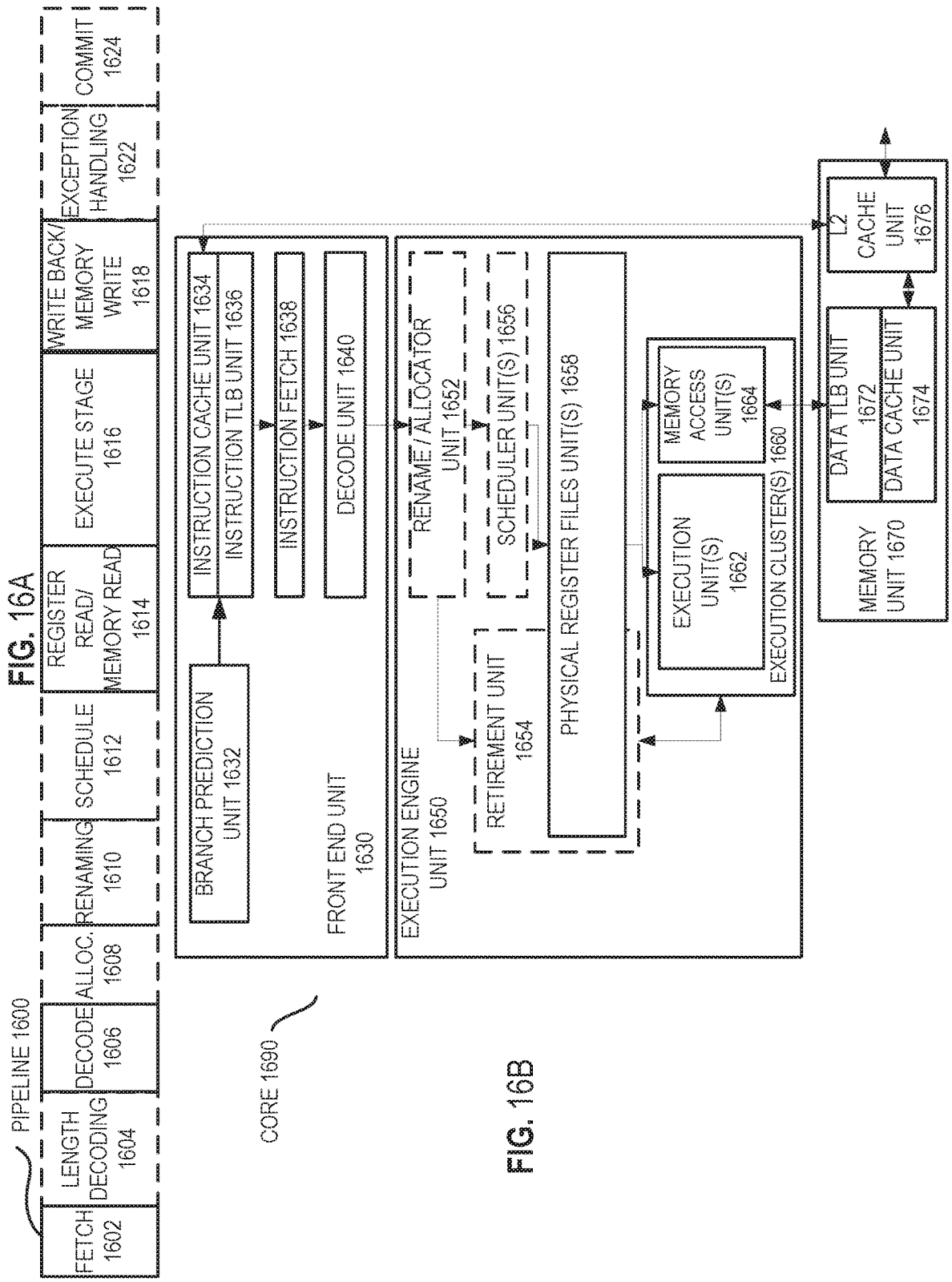
FIG. 16A is a block diagram illustrating both an exemplary in-order pipeline and an exemplary register renaming, out-of-order issue/execution pipeline according to embodiments of the invention.
FIG. 16B is a block diagram illustrating both an exemplary embodiment of an in-order architecture core and an exemplary register renaming, out-of-order issue/execution architecture core to be included in a processor according to embodiments of the invention.

FIG. 16A is a block diagram illustrating both an exemplary in-order pipeline and an exemplary register renaming, out-of-order issue/execution pipeline according to embodiments of the invention. FIG. 16B is a block diagram illustrating both an exemplary embodiment of an in-order architecture core and an exemplary register renaming, out-of-order issue/execution architecture core to be included in a processor according to embodiments of the invention. The solid lined boxes in FIGS. 16A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 16A, a processor pipeline 1600 includes a fetch stage 1602, a length decode stage 1604, a decode stage 1606, an allocation stage 1608, a renaming stage 1610, a scheduling (also known as a dispatch or issue) stage 1612, a register read/memory read stage 1614, an execute stage 1616, a write back/memory write stage 1618, an exception handling stage 1622, and a commit stage 1624.

FIG. 16B shows processor core 1690 including a front end unit 1630 coupled to an execution engine unit 1650, and both are coupled to a memory unit 1670. The core 1690 may be a reduced instruction set computing (RISC) core, a complex instruction set computing (CISC) core, a very long instruction word (VLIW) core, or a hybrid or alternative core type. As yet another option, the core 1690 may be a special-purpose core, such as, for example, a network or communication core, compression engine, coprocessor core, general purpose computing graphics processing unit (GPGPU) core, graphics core, or the like.

The front end unit 1630 includes a branch prediction unit 1632 coupled to an instruction cache unit 1634, which is coupled to an instruction translation lookaside buffer (TLB) 1636, which is coupled to an instruction fetch unit 1638, which is coupled to a decode unit 1640. The decode unit 1640 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1640 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1690 includes a microcode ROM or other medium that stores microcode for certain macroinstructions (e.g., in decode unit 1640 or otherwise within the front end unit 1630). The decode unit 1640 is coupled to a rename/allocator unit 1652 in the execution engine unit 1650.

The execution engine unit 1650 includes the rename/allocator unit 1652 coupled to a retirement unit 1654 and a set of one or more scheduler unit(s) 1656. The scheduler unit(s) 1656 represents any number of different schedulers, including reservations stations, central instruction window, etc. The scheduler unit(s) 1656 is coupled to the physical register file(s) unit(s) 1658. Each of the physical register file(s) units 1658 represents one or more physical register files, different ones of which store one or more different data types, such as scalar integer, scalar floating point, packed integer, packed floating point, vector integer, vector floating point—status (e.g., an instruction pointer that is the address of the next instruction to be executed), etc. In one embodiment, the physical register file(s) unit 1658 comprises a vector registers unit, a write mask registers unit, and a scalar registers unit. These register units may provide architectural vector registers, vector mask registers, and general purpose registers. The physical register file(s) unit(s) 1658 is overlapped by the retirement unit 1654 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1654 and the physical register file(s) unit(s) 1658 are coupled to the execution cluster(s) 1660. The execution cluster(s) 1660 includes a set of one or more execution units 1662 and a set of one or more memory access units 1664. The execution units 1662 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1656, physical register file(s) unit(s) 1658, and execution cluster(s) 1660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1664). It should also be understood that where separate pipelines are used, one or more of these pipelines may be out-of-order issue/execution and the rest in-order.

The set of memory access units 1664 is coupled to the memory unit 1670, which includes a data TLB unit 1672 coupled to a data cache unit 1674 coupled to a level 2 (L2) cache unit 1676. In one exemplary embodiment, the memory access units 1664 may include a load unit, a store address unit, and a store data unit, each of which is coupled to the data TLB unit 1672 in the memory unit 1670. The instruction cache unit 1634 is further coupled to a level 2 (L2) cache unit 1676 in the memory unit 1670. The L2 cache unit 1676 is coupled to one or more other levels of cache and eventually to a main memory.

By way of example, the exemplary register renaming, out-of-order issue/execution core architecture may implement the pipeline 1600 as follows: 1) the instruction fetch 1638 performs the fetch and length decoding stages 1602 and 1604; 2) the decode unit 1640 performs the decode stage 1606; 3) the rename/allocator unit 1652 performs the allocation stage 1608 and renaming stage 1610; 4) the scheduler unit(s) 1656 performs the schedule stage 1612; 5) the physical register file(s) unit(s) 1658 and the memory unit 1670 perform the register read/memory read stage 1614; the execution cluster 1660 perform the execute stage 1616; 6) the memory unit 1670 and the physical register file(s) unit(s) 1658 perform the write back/memory write stage 1618; 7) various units may be involved in the exception handling stage 1622; and 8) the retirement unit 1654 and the physical register file(s) unit(s) 1658 perform the commit stage 1624.

The core 1690 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1690 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1634/1674 and a shared L2 cache unit 1676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 17:
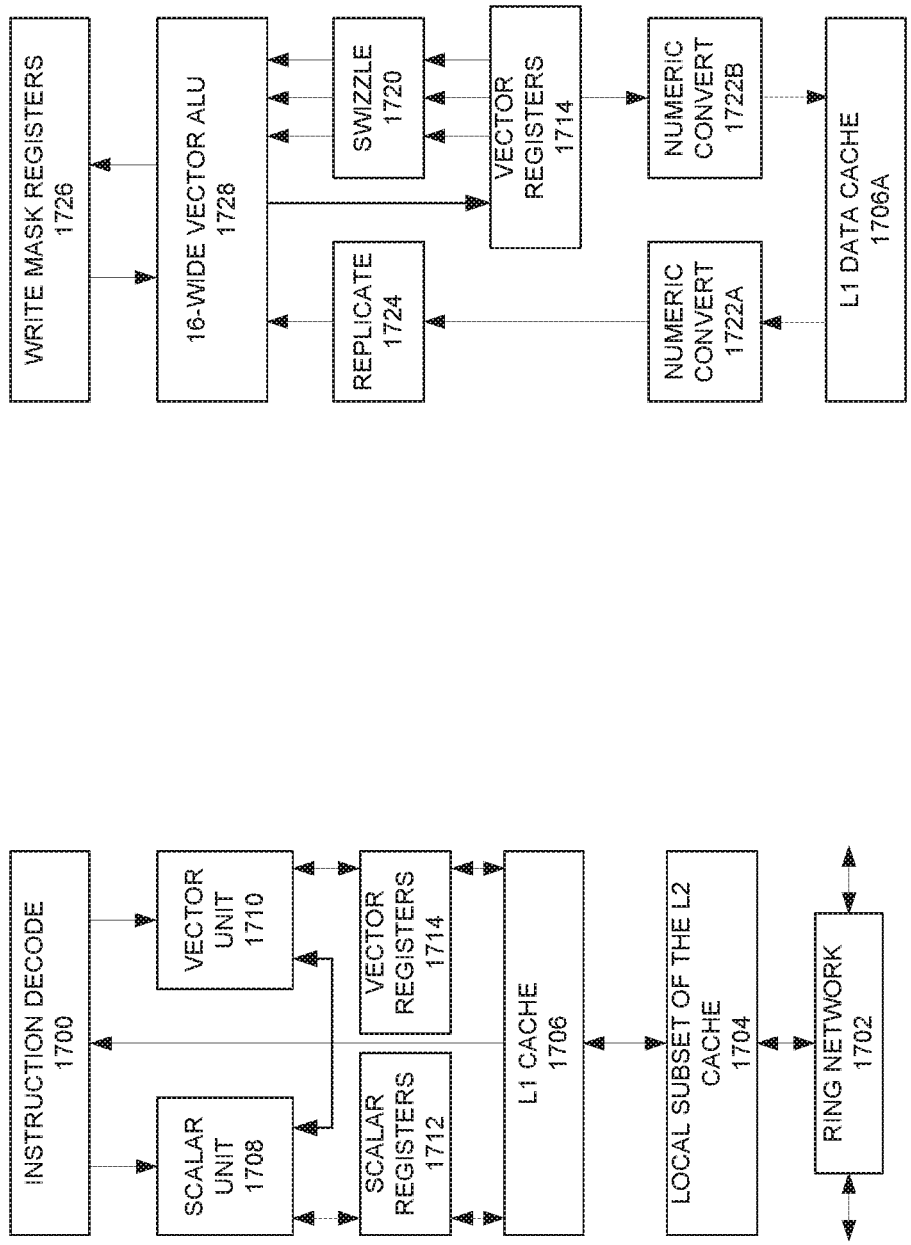
FIGS. 17A-B illustrate a block diagram of a more specific exemplary in-order core architecture, which core would be one of several logic blocks (including other cores of the same type and/or different types) in a chip.

FIGS. 17A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 17A is a block diagram of a single processor core, along with its connection to the on-die interconnect network 1702 and with its local subset of the Level 2 (L2) cache 1704, according to embodiments of the invention. In one embodiment, an instruction decoder 1700 supports the x86 instruction set with a packed data instruction set extension. An L1 cache 1706 allows low-latency accesses to cache memory into the scalar and vector units. While in one embodiment (to simplify the design), a scalar unit 1708 and a vector unit 1710 use separate register sets (respectively, scalar registers 1712 and vector registers 1714) and data transferred between them is written to memory and then read back in from a level 1 (L1) cache 1706, alternative embodiments of the invention may use a different approach (e.g., use a single register set or include a communication path that allow data to be transferred between the two register files without being written and read back).

The local subset of the L2 cache 1704 is part of a global L2 cache that is divided into separate local subsets, one per processor core. Each processor core has a direct access path to its own local subset of the L2 cache 1704. Data read by a processor core is stored in its L2 cache subset 1704 and can be accessed quickly, in parallel with other processor cores accessing their own local L2 cache subsets. Data written by a processor core is stored in its own L2 cache subset 1704 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 17B is an expanded view of part of the processor core in FIG. 17A according to embodiments of the invention. FIG. 17B includes an L1 data cache 1706A part of the L1 cache 1704, as well as more detail regarding the vector unit 1710 and the vector registers 1714. Specifically, the vector unit 1710 is a 16-wide vector processing unit (VPU) (see the 16-wide ALU 1728), which executes one or more of integer, single-precision float, and double-precision float instructions. The VPU supports swizzling the register inputs with swizzle unit 1720, numeric conversion with numeric convert units 1722A-B, and replication with replication unit 1724 on the memory input. Write mask registers 1726 allow predicating resulting vector writes.

Figure 18:
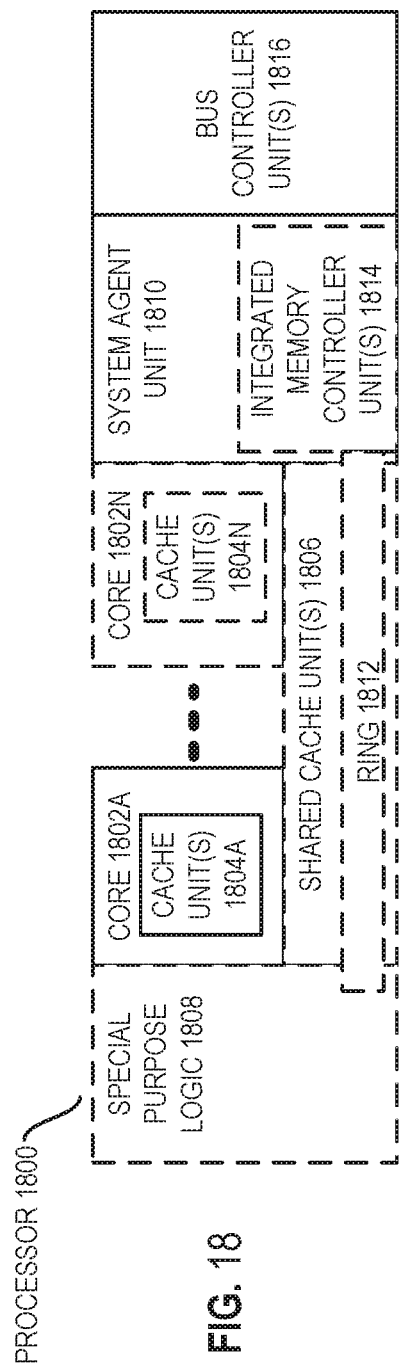
FIG. 18 is a block diagram of a processor that may have more than one core, may have an integrated memory controller, and may have integrated graphics according to embodiments of the invention.

FIG. 18 is a block diagram of a processor 1800 that may have more than one core, may have an integrated memory controller, and may have integrated graphics according to embodiments of the invention. The solid lined boxes in FIG. 18 illustrate a processor 1800 with a single core 1802A, a system agent 1810, a set of one or more bus controller units 1816, while the optional addition of the dashed lined boxes illustrates an alternative processor 1800 with multiple cores 1802A-N, a set of one or more integrated memory controller unit(s) 1814 in the system agent unit 1810, and special purpose logic 1808.

Thus, different implementations of the processor 1800 may include: 1) a CPU with the special purpose logic 1808 being integrated graphics and/or scientific (throughput) logic (which may include one or more cores), and the cores 1802A-N being one or more general purpose cores (e.g., general purpose in-order cores, general purpose out-of-order cores, a combination of the two); 2) a coprocessor with the cores 1802A-N being a large number of special purpose cores intended primarily for graphics and/or scientific (throughput); and 3) a coprocessor with the cores 1802A-N being a large number of general purpose in-order cores. Thus, the processor 1800 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1800 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1806, and external memory (not shown) coupled to the set of integrated memory controller units 1814. The set of shared cache units 1806 may include one or more mid-level caches, such as level 2 (L2), level 3 (L3), level 4 (L4), or other levels of cache, a last level cache (LLC), and/or combinations thereof. While in one embodiment a ring based interconnect unit 1812 interconnects the integrated graphics logic 1808, the set of shared cache units 1806, and the system agent unit 1810/integrated memory controller unit(s) 1814, alternative embodiments may use any number of well-known techniques for interconnecting such units. In one embodiment, coherency is maintained between one or more cache units 1806 and cores 1802-A-N.

In some embodiments, one or more of the cores 1802A-N are capable of multi-threading. The system agent 1810 includes those components coordinating and operating cores 1802A-N. The system agent unit 1810 may include for example a power control unit (PCU) and a display unit. The PCU may be or include logic and components needed for regulating the power state of the cores 1802A-N and the integrated graphics logic 1808. The display unit is for driving one or more externally connected displays.

The cores 1802A-N may be homogenous or heterogeneous in terms of architecture instruction set; that is, two or more of the cores 1802A-N may be capable of execution the same instruction set, while others may be capable of executing only a subset of that instruction set or a different instruction set.

Exemplary Computer Architectures

FIGS. 19-22 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 19:
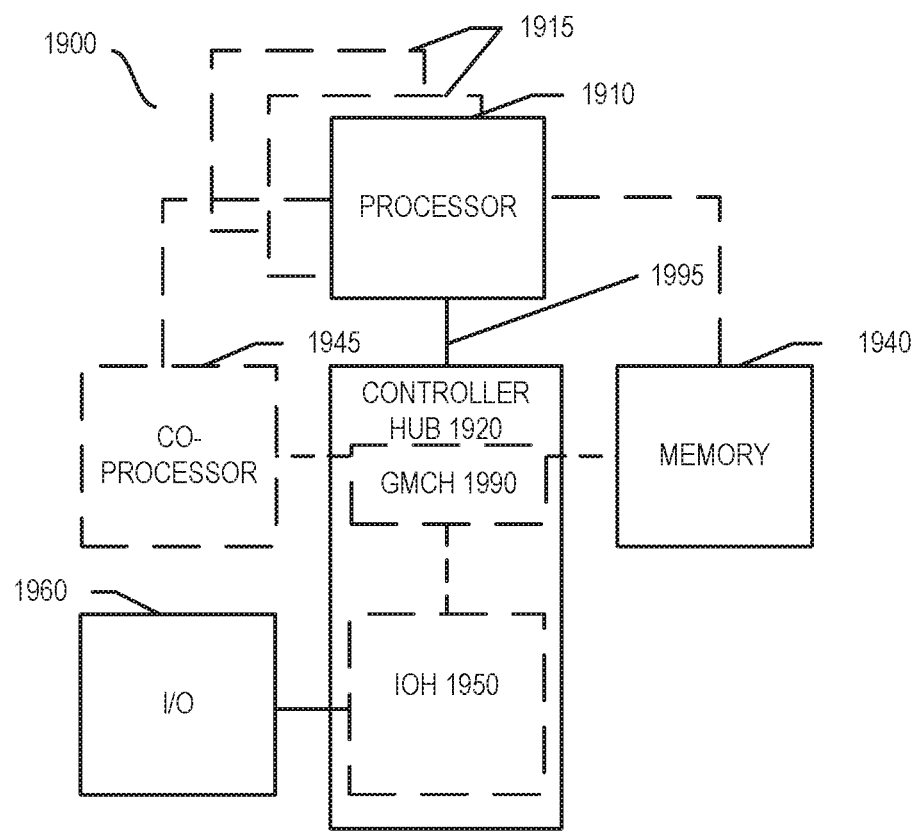
FIGS. 19-22 are block diagrams of exemplary computer architectures.

Referring now to FIG. 19, shown is a block diagram of a system 1900 in accordance with one embodiment of the present invention. The system 1900 may include one or more processors 1910, 1915, which are coupled to a controller hub 1920. In one embodiment the controller hub 1920 includes a graphics memory controller hub (GMCH) 1990 and an Input/Output Hub (IOH) 1950 (which may be on separate chips); the GMCH 1990 includes memory and graphics controllers to which are coupled memory 1940 and a coprocessor 1945; the IOH 1950 is couples input/output (I/O) devices 1960 to the GMCH 1990. Alternatively, one or both of the memory and graphics controllers are integrated within the processor (as described herein), the memory 1940 and the coprocessor 1945 are coupled directly to the processor 1910, and the controller hub 1920 in a single chip with the IOH 1950.

The optional nature of additional processors 1915 is denoted in FIG. 19 with broken lines. Each processor 1910, 1915 may include one or more of the processing cores described herein and may be some version of the processor 1800.

The memory 1940 may be, for example, dynamic random access memory (DRAM), phase change memory (PCM), or a combination of the two. For at least one embodiment, the controller hub 1920 communicates with the processor(s) 1910, 1915 via a multi-drop bus, such as a frontside bus (FSB), point-to-point interface such as QuickPath Interconnect (QPI), or similar connection 1995.

In one embodiment, the coprocessor 1945 is a special-purpose processor, such as, for example, a high-throughput MIC processor, a network or communication processor, compression engine, graphics processor, GPGPU, embedded processor, or the like. In one embodiment, controller hub 1920 may include an integrated graphics accelerator.

There can be a variety of differences between the physical resources 1910, 1915 in terms of a spectrum of metrics of merit including architectural, microarchitectural, thermal, power consumption characteristics, and the like.

In one embodiment, the processor 1910 executes instructions that control data processing operations of a general type. Embedded within the instructions may be coprocessor instructions. The processor 1910 recognizes these coprocessor instructions as being of a type that should be executed by the attached coprocessor 1945. Accordingly, the processor 1910 issues these coprocessor instructions (or control signals representing coprocessor instructions) on a coprocessor bus or other interconnect, to coprocessor 1945. Coprocessor(s) 1945 accept and execute the received coprocessor instructions.

Figure 20:
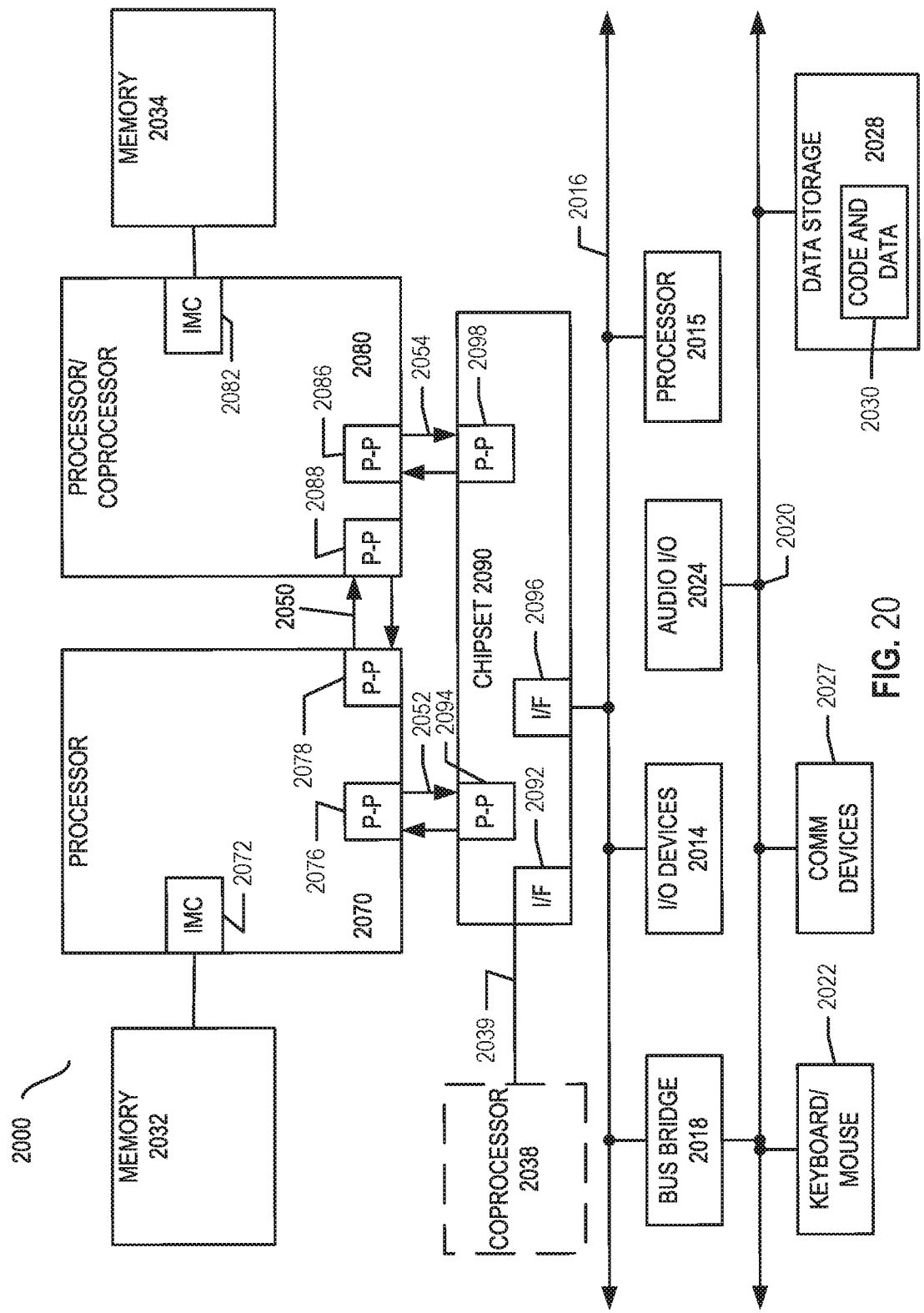

Referring now to FIG. 20, shown is a block diagram of a first more specific exemplary system 2000 in accordance with an embodiment of the present invention. As shown in FIG. 20, multiprocessor system 2000 is a point-to-point interconnect system, and includes a first processor 2070 and a second processor 2080 coupled via a point-to-point interconnect 2050. Each of processors 2070 and 2080 may be some version of the processor 1800. In one embodiment of the invention, processors 2070 and 2080 are respectively processors 1910 and 1915, while coprocessor 2038 is coprocessor 1945. In another embodiment, processors 2070 and 2080 are respectively processor 1910 coprocessor 1945.

Processors 2070 and 2080 are shown including integrated memory controller (IMC) units 2072 and 2082, respectively. Processor 2070 also includes as part of its bus controller units point-to-point (P-P) interfaces 2076 and 2078; similarly, second processor 2080 includes P-P interfaces 2086 and 2088. Processors 2070, 2080 may exchange information via a point-to-point (P-P) interface 2050 using P-P interface circuits 2078, 2088. As shown in FIG. 20, IMCs 2072 and 2082 couple the processors to respective memories, namely a memory 2032 and a memory 2034, which may be portions of main memory locally attached to the respective processors.

Processors 2070, 2080 may each exchange information with a chipset 2090 via individual P-P interfaces 2052, 2054 using point to point interface circuits 2076, 2094, 2086, 2098. Chipset 2090 may optionally exchange information with the coprocessor 2038 via a high-performance interface 2039. In one embodiment, the coprocessor 2038 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 2090 may be coupled to a first bus 2016 via an interface 2096. In one embodiment, first bus 2016 may be a Peripheral Component Interconnect (PCI) bus, or a bus such as a PCI Express bus or another third generation I/O interconnect bus, although the scope of the present invention is not so limited.

As shown in FIG. 20, various I/O devices 2014 may be coupled to first bus 2016, along with a bus bridge 2018 which couples first bus 2016 to a second bus 2020. In one embodiment, one or more additional processor(s) 2015, such as coprocessors, high-throughput MIC processors, GPGPU's, accelerators (such as, e.g., graphics accelerators or digital signal processing (DSP) units), field programmable gate arrays, or any other processor, are coupled to first bus 2016. In one embodiment, second bus 2020 may be a low pin count (LPC) bus. Various devices may be coupled to a second bus 2020 including, for example, a keyboard and/or mouse 2022, communication devices 2027 and a storage unit 2028 such as a disk drive or other mass storage device which may include instructions/code and data 2030, in one embodiment. Further, an audio I/O 2024 may be coupled to the second bus 2020. Note that other architectures are possible. For example, instead of the point-to-point architecture of FIG. 20, a system may implement a multi-drop bus or other such architecture.

Figure 21:
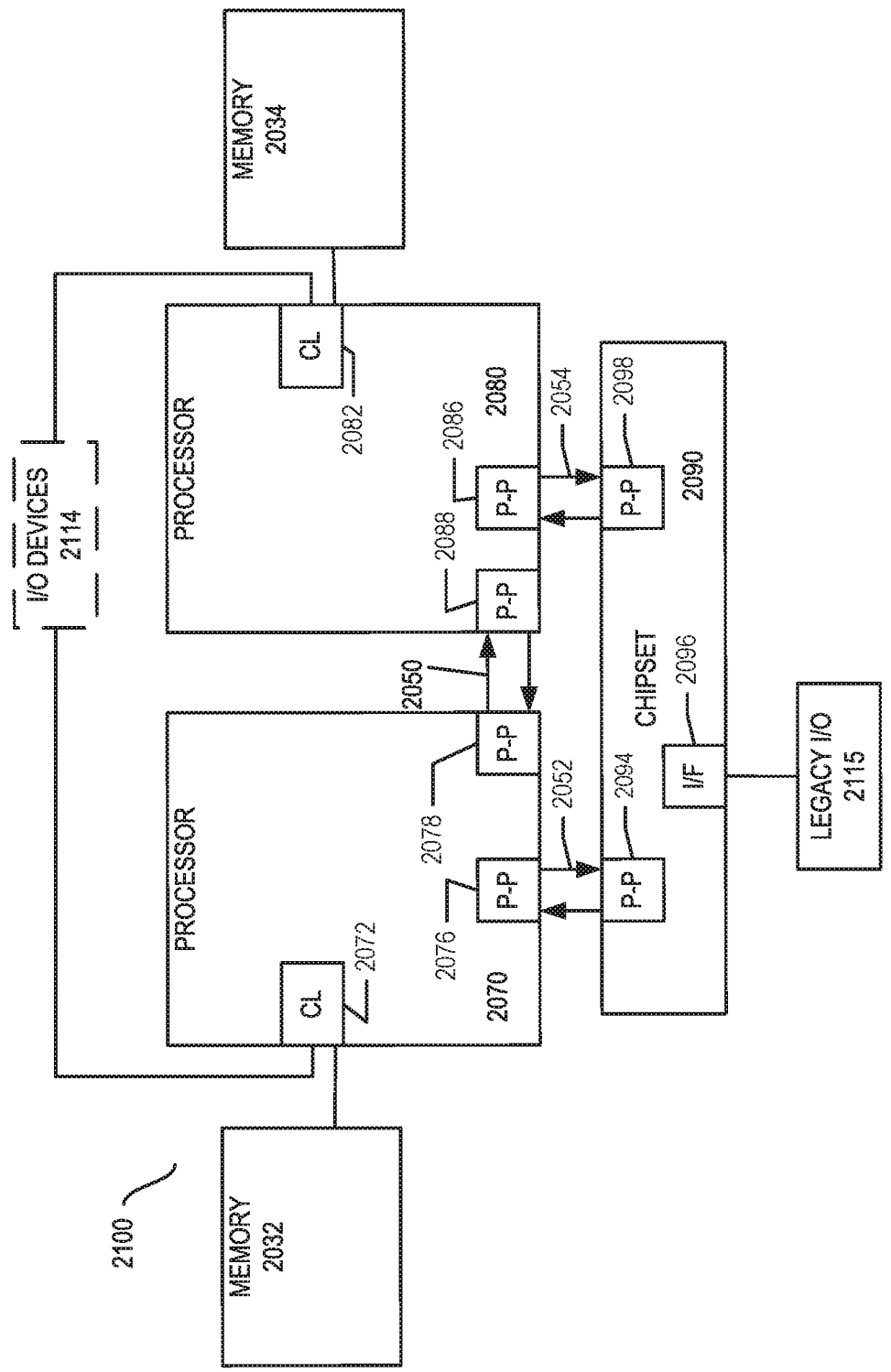

Referring now to FIG. 21, shown is a block diagram of a second more specific exemplary system 2100 in accordance with an embodiment of the present invention. Like elements in FIGS. 20 and 21 bear like reference numerals, and certain aspects of FIG. 20 have been omitted from FIG. 21 in order to avoid obscuring other aspects of FIG. 21.

FIG. 21 illustrates that the processors 2070, 2080 may include integrated memory and I/O control logic ("CL") 2072 and 2082, respectively. Thus, the CL 2072, 2082 include integrated memory controller units and include I/O control logic. FIG. 21 illustrates that not only are the memories 2032, 2034 coupled to the CL 2072, 2082, but also that I/O devices 2114 are also coupled to the control logic 2072, 2082. Legacy I/O devices 2115 are coupled to the chipset 2090.

Figure 22:
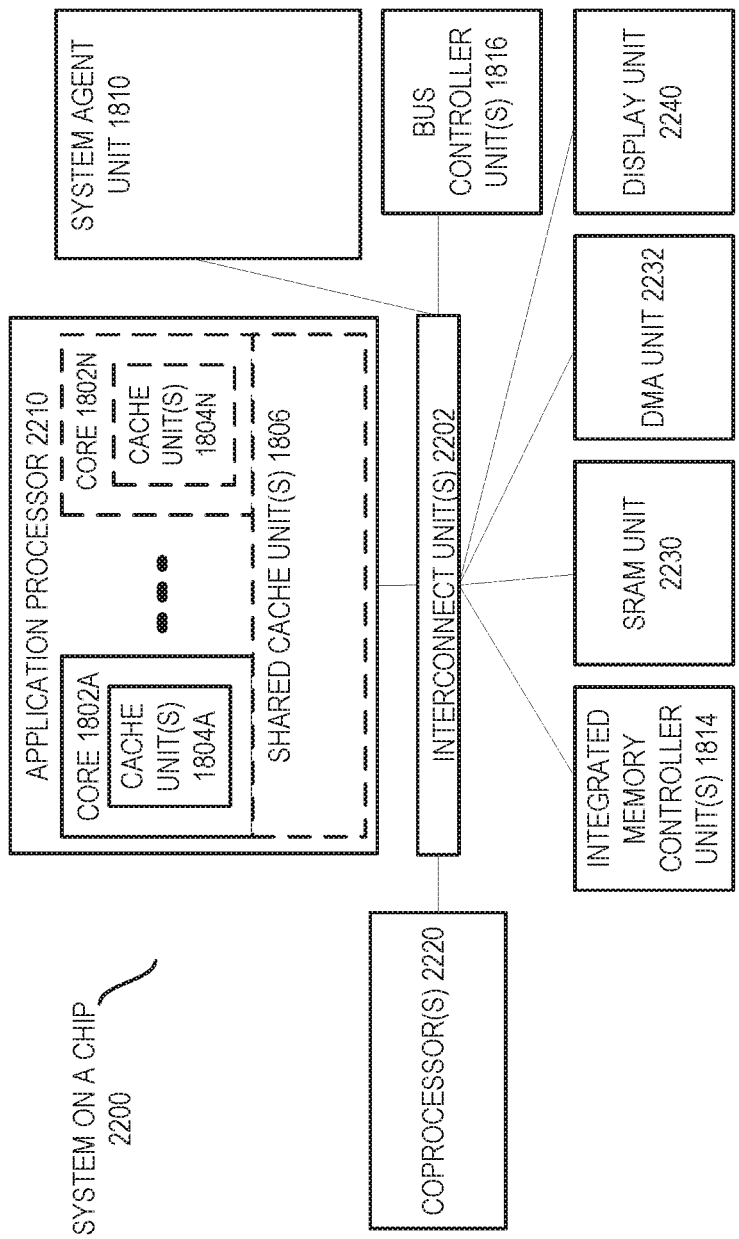

Referring now to FIG. 22, shown is a block diagram of a SoC 2200 in accordance with an embodiment of the present invention. Similar elements in FIG. 18 bear like reference numerals. Also, dashed lined boxes are optional features on more advanced SoCs. In FIG. 22, an interconnect unit(s) 2202 is coupled to: an application processor 2210 which includes a set of one or more cores 202A-N and shared cache unit(s) 1806; a system agent unit 1810; a bus controller unit(s) 1816; an integrated memory controller unit(s) 1814; a set or one or more coprocessors 2220 which may include integrated graphics logic, an image processor, an audio processor, and a video processor; an static random access memory (SRAM) unit 2230; a direct memory access (DMA) unit 2232; and a display unit 2240 for coupling to one or more external displays. In one embodiment, the coprocessor(s) 2220 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 2030 illustrated in FIG. 20, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 23 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 23 shows a program in a high level language 2302 may be compiled using an x86 compiler 2304 to generate x86 binary code 2306 that may be natively executed by a processor with at least one x86 instruction set core 2316. The processor with at least one x86 instruction set core 2316 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2304 represents a compiler that is operable to generate x86 binary code 2306 (e.g., object code) that can, with or without additional linkage processing, be executed on the processor with at least one x86 instruction set core 2316. Similarly, FIG. 23 shows the program in the high level language 2302 may be compiled using an alternative instruction set compiler 2308 to generate alternative instruction set binary code 2310 that may be natively executed by a processor without at least one x86 instruction set core 2314 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2312 is used to convert the x86 binary code 2306 into code that may be natively executed by the processor without an x86 instruction set core 2314. This converted code is not likely to be the same as the alternative instruction set binary code 2310 because an instruction converter capable of this is difficult to make; however, the converted code will accomplish the general operation and be made up of instructions from the alternative instruction set. Thus, the instruction converter 2312 represents software, firmware, hardware, or a combination thereof that, through emulation, simulation or any other process, allows a processor or other electronic device that does not have an x86 instruction set processor or core to execute the x86 binary code 2306.

We claim:

1. An apparatus comprising:
at least one monitoring circuit to monitor for memory accesses to an address space;
memory to store at least one monitoring data structure to store an identifier of the address space, wherein a bit mask is to be used to identify one or more nodes that have access to the address space; and
at least one hardware core to execute an instruction to enable the monitoring circuit, wherein the instruction includes fields for a base address, a memory size granularity, a tracking granularity, a mode, and a size of the address space.

2. The apparatus of claim 1, wherein the memory size granularity is one of at least a cache line, page, large page, or huge page.

3. The apparatus of claim 1, wherein the tracking granularity is to be specified as a number of node groups.

4. The apparatus of claim 1, further comprising:
caching agent circuitry to process memory requests from at least one of the plurality of hardware cores; and
home agent circuitry to process memory requests from the caching agent and as a home for part of a memory space of the apparatus.

5. The apparatus of claim 1, further comprising:
a buffer to store remote store requests that are a part of a transaction initiated by an execution of the instruction.

6. A system comprising:
memory;
at least one monitoring circuit to monitor for memory accesses to an address space in the memory;
storage to store at least one monitoring data structure to store an identifier of the address space, wherein a bit mask is to be used to identify nodes that have access to the address space; and
at least one hardware core to execute a single instruction to enable the monitoring circuit, wherein the instruction includes fields for a base address, a memory size granularity, a mode, and a size of the address space as a multiple of the granularity.

7. The system of claim 6, wherein the memory size granularity is one of at least a cache line, page, large page, or huge page.

8. The system of claim 6, further comprising:
caching agent circuitry to process memory requests from at least one of the plurality of hardware cores; and
home agent circuitry to process memory requests from the caching agent and as a home for part of a memory space of the apparatus.

9. The system of claim 6, further comprising:
a buffer to store remote store requests that are a part of a transaction initiated by an execution of the instruction.

10. The system of claim 6, wherein the instruction has an opcode mnemonic of SMONITOR.

11. The system of claim 6, wherein the address space is from the base address to the base address+(memory granularity×size).

* * * * *